United States Patent
Drummond et al.

(10) Patent No.: US 12,392,493 B2
(45) Date of Patent: *Aug. 19, 2025

(54) SMOKELESS FIRE PIT

(71) Applicant: BioLite, Inc., Brooklyn, NY (US)

(72) Inventors: Alexander H. Drummond, Portland, OR (US); Jonathan N. Cedar, Brooklyn, NY (US); Timothy M. Connelly, Brooklyn, NY (US); Venkatesh R. Iyer, Brooklyn, NY (US); David Ryan Gist, Brooklyn, NY (US); Melinda Abbruzzi, Brooklyn, NY (US); Benjamin E. Zelnick, Brooklyn, NY (US); Steven Michael Grind, Brooklyn, NY (US)

(73) Assignee: Biolite, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,782

(22) Filed: Jun. 13, 2022

(65) Prior Publication Data
US 2022/0404021 A1 Dec. 22, 2022

Related U.S. Application Data

(63) Continuation of application No. 15/870,544, filed on Jan. 12, 2018, now Pat. No. 11,359,816.

(60) Provisional application No. 62/445,345, filed on Jan. 12, 2017.

(51) Int. Cl.
| | |
|---|---|
| *F24B 1/18* | (2006.01) |
| *A47J 37/07* | (2006.01) |
| *F24B 1/182* | (2006.01) |
| *F24B 1/19* | (2006.01) |
| *F24B 1/195* | (2006.01) |

(52) U.S. Cl.
CPC ............ *F24B 1/19* (2013.01); *A47J 37/0754* (2013.01); *F24B 1/182* (2013.01); *F24B 1/195* (2013.01)

(58) Field of Classification Search
CPC .. F24B 3/00; F24B 1/181; F24B 1/195; F24B 1/18; A47J 37/0704; A47J 27/12; A47J 37/0713
See application file for complete search history.

(56) References Cited

U.S. PATENT DOCUMENTS

| | | | |
|---|---|---|---|
| 4,111,181 | A | 9/1978 | Canney |
| 4,373,702 | A | 2/1983 | Jayaraman |
| 4,479,481 | A | 10/1984 | Ingersoll |
| 5,462,043 | A | 10/1995 | Rose |
| 6,769,909 | B2 | 8/2004 | Schwartz |
| 6,817,354 | B2 | 11/2004 | Laitinen |

(Continued)

FOREIGN PATENT DOCUMENTS

| | | |
|---|---|---|
| CN | 204797634 U | 11/2015 |
| KR | 20080091977 A | 10/2008 |
| KR | 100877590 B1 | 1/2009 |

*Primary Examiner* — Gregory A Wilson
(74) *Attorney, Agent, or Firm* — Loginov & Associates, PLLC; William A. Loginov

(57) ABSTRACT

A combustion device includes a combustion chamber with an outer wall enclosing a combustion space that can contain a fuel source on an adjustable fuel rack, side walls, a lower air jet tube and at least one air upper jet tube, a top opening, a grill top assembly to cover the opening, and a detachable power module. The power module can have batteries and a blower. The blower can force ambient air into a manifold, through the jet tubes, through ports in the jet tubes, and into the combustion chamber.

22 Claims, 18 Drawing Sheets

(56) References Cited

U.S. PATENT DOCUMENTS

| | | |
|---|---|---|
| 7,798,139 B2 | 9/2010 | Gagas |
| 2005/0121018 A1 | 6/2005 | Rosen |
| 2007/0240583 A1 | 10/2007 | Lee |
| 2008/0168977 A1 | 7/2008 | Daud |
| 2009/0056695 A1 | 3/2009 | Cosgrove |
| 2015/0136112 A1 | 5/2015 | Dyson |
| 2015/0168015 A1 | 6/2015 | Marple |
| 2016/0360925 A1 | 12/2016 | Chun |
| 2018/0045417 A1 | 2/2018 | Hlebaen |

SMOKELESS FIRE PIT

RELATED APPLICATION

This application is a continuation of Co-Pending U.S. patent application Ser. No. 15/870,544, entitled SMOKELESS FIRE PIT, filed Jan. 12, 2018, which claims the benefit of U.S. Provisional Application Ser. No. 62/445,345, entitled SMOKELESS FIRE PIT, filed Jan. 12, 2017, the teachings of each of which applications are expressly incorporated herein by reference.

FIELD OF THE INVENTION

The present invention relates in general to outdoor heating equipment and in particular, relates to a fire pit that is smokeless.

BACKGROUND OF THE INVENTION

Fire pits are a source of combustion that gives off thermal energy as heat for warmth and cooking, as well as providing a social gathering place. Fire pits are a contained place for inserting fuel for combustion (for example, wooden logs and kindling). By way of example, fire pits can be a simple depression in the earth, a raised rock lined construction, or a raised ceramic and/or metal housing with legs. Combustion produces smoke, and even in the lightest of airs, the fire will draw air past the people sitting about the fire pit. This movement of airs can create small vortices, or personal eddies, around the people surrounding the fire pit. Combustion gases, such as smoke, can be drawn towards these eddies when winds shift, creating the impression to most everyone seated around the fire that the smoke is heading towards them, regardless of where they are seated.

The smoke from a fire is a mixture of gases and small suspended particles of soot or other solids, resulting from the burning of materials such as wood. The smoke is a collection of airborne solid and liquid particulates and gases emitted when a material undergoes combustion or pyrolysis, together with the quantity of air that is entrained or otherwise mixed into the mass. Most of the moisture content remaining in firewood consists of wood resins. As wood heats up in the fire chamber, these resins emit combustible gases which, if somehow ignited, can account for as much as half the heat output of the fire. When green or wet firewood is burned, the extra water content turns to steam and mixes with the wood gases, preventing them from igniting and releasing their heat value. Conventional fire pits therefore miss half of their potential heat capability which goes up in the smoke. A hot, more efficient fire actually consumes virtually all of the smoke components before they can escape.

Fire pits can vary in complexity from a simple pit in the ground to a portable combustion device. There are commercially available fire pits constructed of metals, ranging in size from small portable units to large, immobile units. Some of the disadvantages of fire pits are the above-mentioned 'following smoke' effect, as well as the sparks that can fly about in the combustion gases, smoldering logs at the end of a burn, adjustment of the flame and viewing of the flame by all of the people gathered around the pit. Portability can be an issue for the larger metal fire pits, leading to rust problems when not taken in out of the rain. Portability can also be a factor for hikers, campers, boaters or recreational vehicle users, where weight or size can be a factor. Cleaning out the units can also be problematic. Larger fire pits require removing ash, charcoal and unburned wood. Disposing this can be messy and dangerous. Unless the fire is thoroughly extinguished and the debris is properly disposed of there is risk of starting a fire. The sparks, smoke and flame height can also create safety issues and potentially impact on the personal health of the gathered people. The fire pit can be used as a grill for cooking, with the grill either placed above the combustion as an add-on, or integrated into the structure of the fire pit.

Accordingly, it would be desirable to provide a portable combustion device that is capable of being used as a stove for cooking and/or heating, which burns commonly available wood and other biomass, and provides similar heat output as other liquid or gas fuels, that is portable, efficient in its burn and relatively free of smoke and sparks. The combustion device should desirably be easy to carry, low-maintenance and burn fuel without exhausting significant soot, smoke or toxic combustion byproducts. Additionally, with complete combustion there are very few coals and un-combusted wood left at the end of the burn. The combustion should desirably employ inexpensive and commercially available components and conventional construction techniques in its manufacture.

SUMMARY OF THE INVENTION

The present invention overcomes the disadvantages of the prior art by providing a lower and upper forced air system to enhance the combustion process. The advantages of having a lower and upper forced air system is applicable to fire pits of any shape and size. The present invention provides a combustion device having a combustion chamber with an opening between the interior of the combustion chamber and an ambient environment outside of the combustion chamber. The combustion chamber can have at least one lower air jet tube having at least one lower port in communication between an interior of the lower air jet tube and the combustion chamber where the at least one lower port is in a lower region of the combustion chamber. The combustion chamber can also have at least one upper air jet tube having at least one upper port in communication between an interior of the upper jet tube and the combustion chamber, where the at least one upper port is in an upper region of the combustion chamber. The combustion chamber can also have a blower operatively connected to the air jet tubes, so that when the blower is turned on, air from the blower is forced through the air jet tubes, through the ports, and into the combustion chamber.

In an embodiment, the at least one lower port can be within the bottom 30% of the combustion chamber. The at least one lower port can comprise at least one port directed upwards and at least one port directed downwards. The at least one upper port can be within the top half of the combustion chamber. The combustion device can have a fuel rack, where the at least one lower port is lower than the fuel rack. The height of the fuel rack can be adjustable. At least one upper port can be higher than the fuel rack. The combustion chamber can have a plurality of perforations between the interior of the combustion chamber and the ambient environment outside of the combustion chamber. The combustion device can have a manifold in fluid communication between the blower and the jet tubes, so that when the blower is turned on, air from the blower is forced through the air jet tubes, through the ports, and into the combustion chamber. The combustion device can have a grill surface at least partially over the opening between the interior of the combustion chamber and the ambient environment outside of the combustion chamber. The grill surface can slide on a track between a first position over the opening and a second position that exposes at least a portion of the opening, so that new fuel can be added to the combustion device without removing the grill surface from the combustion device. The combustion device can have a detachable power module and a rechargeable battery within the detachable power module, wherein the rechargeable battery can be selectively connected to the blower to provide power to the blower. The blower can be within the detachable power module, wherein the blower can be selectively connectable to the manifold. At least one upper jet tube can be located along sidewalls of the combustion chamber. The combustion device can have a slidable ash door in the bottom of the combustion chamber, the slidable ash door can be adapted for a user to grasp and slide the slidable ash door open while a fire is burning in the combustion device. The combustion device can have at least one handle, where the at least one handle is adapted for a user to grasp the at least one handle and move the combustion device by hand while a fire is burning in the combustion device. The flow rate of air from the blower into the combustion chamber can be controllable by adjusting the speed of the blower. The speed of the blower can be adjustable through a wireless connection. The flow rate of air from the blower into at least one jet tube can be controllable by adjusting a baffle between the manifold and the at least one jet tube.

A method for smokeless combustion includes actuating a fan motor that is attached to a blower; drawing ambient air from the exterior of the combustion device; propelling the ambient air through the blower and into a manifold; forcing the propelled air into at least one of a lower jet tube or a upper jet tube; forcing the propelled air within the at least one jet tube along the body of the jet tube and out a port; and forcing a sufficient quantity of air at a sufficient rate to cause complete combustion of the fuel and exhaust gases such that the quantity of emitted smoke is reduced toward a zero value.

BRIEF DESCRIPTION OF THE DRAWINGS

The invention description below refers to the accompanying drawings, of which.

DETAILED DESCRIPTION

Figure 1:
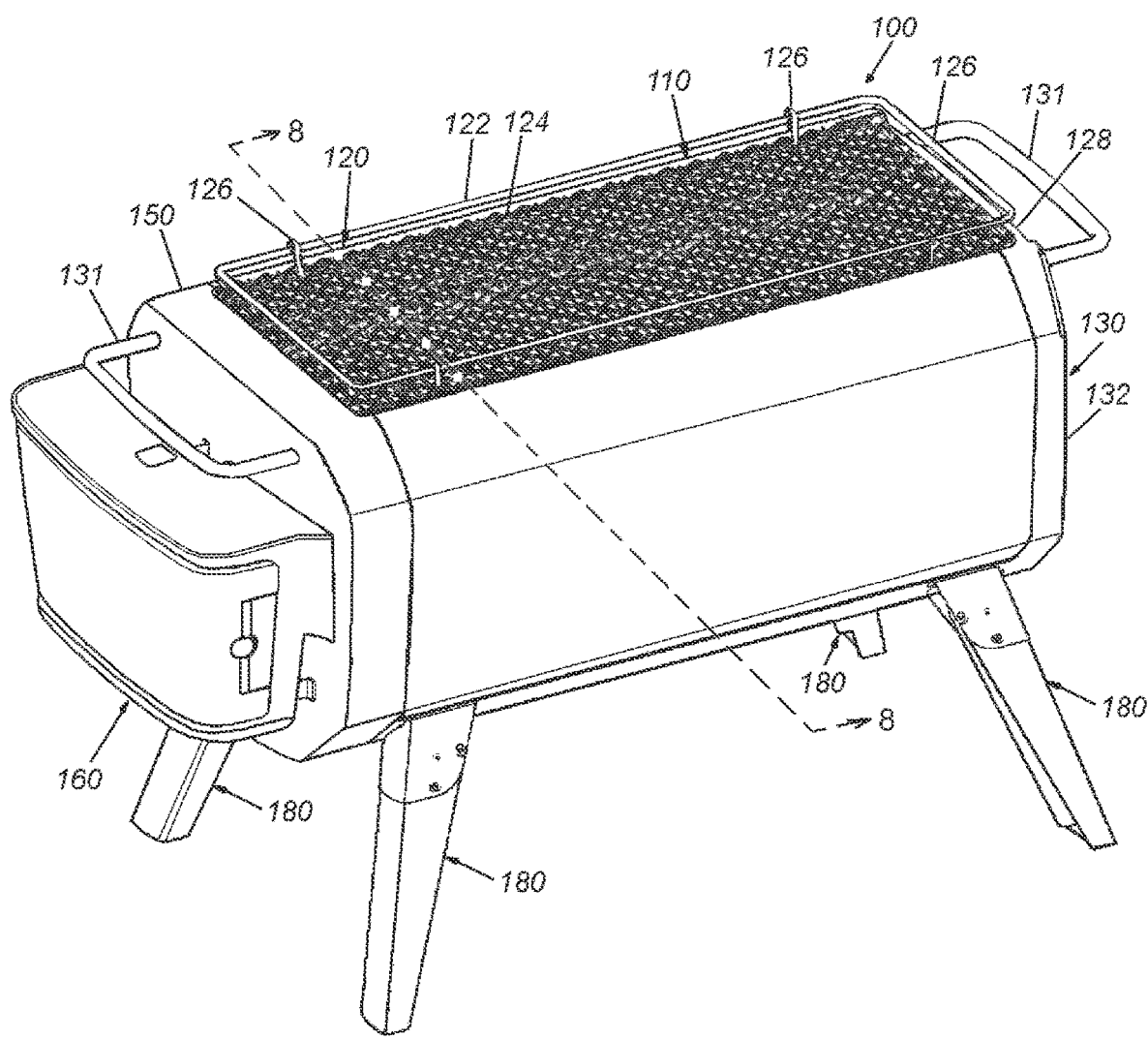
FIG. 1 is a perspective view of a smokeless fire pit, according to an illustrative embodiment.

A smokeless "fire pit" (as defined herein) is a compact and portable combustion device that can use a forced air mechanism to burn fuel more cleanly with brighter illumination, more efficient heating and without the inconvenience of smoke from the fire following people located around the fire pit. A group of people can comfortably sit in a full circle around the combustion device, which can have an edge at (approximately) waist level when seated, and experience an open fire without (free of) the inconvenience of smoke from the fire following people around because a forced air mechanism encourages a more complete combustion of the fuel, leaving little smoke. With the forced air, the fire burns cleaner, hotter and provides a brighter illumination. The variable speed of the fan and forced air also allows a user to control the rate of combustion. An illustrative fire pit 100 is shown in FIG. 1, according to an embodiment. The overall weight of the fire pit 100 is about 18 pounds, according to an illustrative (exemplary) embodiment. The relatively light weight and overall compact size provides a fire pit that can be carried to a beach, where there can be fire use restrictions or limited fuel availability. The compact size can be convenient for confined patios and backyards. The fire pit can be carried while a fire is lit within the fire pit, providing for relocation during use, where larger fixed fire pits cannot be so moved. The portability of the fire pit can also allow the fire pit to be stored indoors, in a house, shed, garage, or other out building, thereby avoiding environmentally-induced deterioration via rust and corrosion.

The illustrative fire pit 100 is a combustion device that can burn at least one of wood, coals, compressed wood logs or bricquettes as fuel. The fire pit 100 is sized to accommodate cord wood in the size range of up to approximately 16 inches long, without the need for further cutting or splitting of the logs. The controlled air flow system provides for a controlled burn of a longer time and greater efficiency, as will be more fully described below. The air flow from the impeller fan, (hereinafter called a "blower") through a manifold into the combustion chamber can be controllable by at least one of increasing or decreasing the speed of the blower such that the combustion consumes at least a portion of the exhaust gases that create smoke, flame size and combustion rate. In an embodiment, the illustrative blower is a radial fan. In another embodiment, the blower can be an axial fan. The fire pit 100 can include the opening 110 for the fire pit, a grill top assembly 120 that covers the opening 110, a body housing 130 that encloses a combustion chamber that can include a fuel source on an adjustable fuel rack, side walls, end caps and/or at least one of a plurality of legs 180. The fire pit 100 can also include at least one lower air jet tube and at least one upper air jet tube. The jet tubes can extend from a manifold to receive forced air from the manifold and into the combustion chamber that can be situated above a base plate 140. A power module 160 can include a battery pack, an air blower that can be a radial impeller fan, and that can be constructed and arranged to drive air from an ambient source into a manifold or directly into the jet tubes, a fan motor, fan motor controls. A primary and secondary forced air system enhances the combustion process and is applicable to fire pits of any shape and size.

In an illustrative embodiment, the grill top assembly 120 is a unit that can move laterally onto and off or can be cantilevered from the top of fire pit 100, as described more fully below. The grill top can slide laterally in a track or groove so that it can be entirely removed, and/or at least partially removed to allow for the addition of new fuel while still retaining partially cooked foods on the flat grill top. This can allow new fuel to be added into the combustion chamber without a user needing to entirely remove the grill top and any food on the grill top. In alternate embodiments, the grill top can be lifted vertically off of the combustion device, can have hinge pins that allow the grill top assembly to hinge away from the combustion device and/or slide laterally out of the hinge mechanism, or other possible mechanisms. The grill top assembly 120 can include a support rail 122 that is attached to a spark arrestor 124, which can be a wire mesh screen for reducing the presence of sparks in the combustion gases emanating from the fire pit during combustion. In the illustrative embodiment, the spark arrestor 124 is shown as also being the grilling surface, however the spark arrestor 124 can be separate from, and below the grilling surface. The support rail 122 also functions to prevent any foods placed onto the grill top from sliding off the grill during cooking. The shape of the grill top assembly 120 and the body housing 130 are rectilinear. In other embodiments, it is contemplated that they can have another shape (for example, a circular or ovoid profile). The illustrative support rail 122 is likewise rectilinear, and is supported by vertical supports 126 that are attached to the perimeter support 128. The perimeter support 128 and the support rail 122 can be sized to the same dimensions and can be formed of wire of a similar gauge. The perimeter support 128, support rail 122 and vertical supports can be connected and joined by a welding mechanism. The wire mesh of the spark arrestor 124 can be of a lighter gauge wire than the support rail, and can be formed with a welding process to form a unitary structure with the perimeter support 128, support rail 122 and vertical supports 126. Handles 131 can be attached to the body housing 130 at either end and can be counter posed. In an embodiment, a combustion device has at least one handle attached to an end cap for carrying and positioning the combustion device. Handles 131 are constructed and arranged to support the weight of the fire pit during movement.

The side panels 132 of the body housing 130 are perforated with at least one hole in its material. The perforated metal sides of the fire pit 100 facilitate several functions. First, the perforated metal sides 132 control air flow. They benefit the efficiency of the combustion process by providing introduction of air from the ambient air, not only when the fan is running but for passive operation should the fan lose power or the user prefer not to use the blower fan of attached the power module 160. Ambient air can come from the ambient environment outdoors where the combustion device can be used. The power module 160 can include a control interface linked to a control unit for actuating and managing a blower fan to create a flow of air in the fire pit, and batteries for maintaining that air flow. In other embodiments, the control unit can adjust one or more adjustable baffles and regulate air flow into the combustion chamber. The control unit can include a central processor and can be programmable and/or pre-programmed. The power module can be directly controllable, and/or can be controllable remotely by at least one Bluetooth® device, a cellular phone or programmable computing device. The power module 160 can be attachable and detachable. By way of non-limiting example, the power module can be attached and detached by action of a button that causes engaging locking arms to inter-engage with brackets mounted on the manifold 150 (as will be described more fully below). The perforated metal sides 132 can be "tuned" to a specific hole opening size so that wind doesn't interfere with the controlled combustion air flow from the lower and upper jets. In an embodiment, a perforation hole has a diameter of approximately 1 mm and the holes are spaced approximately 1 mm apart. It is contemplated that in further embodiments, the holes can be larger or smaller (for example, 0.75 mm or 1.5 mm), and either situated closer or farther apart. The perforated sides 132 keep sparks in but allow the flame to be observed. The shape of the sides, which can be extruded, also encourages efficient combustion. Most importantly, while lit at night, the perforated sides seem to "disappear", allowing for a better viewing experience. As used herein the directional terms, such as, but not limited to, "up" and "down", "upward" and "downward", "rear", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to the acting direction of the force of gravity.

The power module 160 can be positioned at one end of the body housing 130 and will be more fully described below. The power module 160 controls a blower fan that provides a flow of air into the interior of the body housing 130 for control and sustainment of the combustion process by a multiplicity of air jets (explained more fully below). The body housing can be sized such that it has enough capacity to hold up to three conventionally sized pieces of cordwood. Fuel can be inserted at the top of the body housing by sliding back the grill top assembly (if it is in use) and lit conventionally by using kindling or inserting fuel onto the embers after the initial wood has burned down. The body housing can be constructed of materials, such as steel alloys, aluminum and aluminum alloys, titanium, ceramics, or any other material (or combination of materials) that is durable and capable of withstanding high temperatures. The size of the flame can be controlled by adjusting the blower fan speed and/or by adjusting at least one baffle between the manifold and at least one jet tube, explained more fully below. Adjusting the fan speed can be accomplished remotely, using a Bluetooth® wireless communication link, or another remote communications system, with a receiver built into the power module. Bluetooth® is a wireless technology standard for exchanging data over short distances. The Bluetooth® feature can be embedded in the power module control so a person can control the fan speed remotely through a smartphone or other (e.g. handheld) device (e.g. a tablet, laptop, etc.) as well as monitoring battery capacity and the lifespan of the current battery charge. The implementation of an application on a remote device that communicates via an embedded wireless communication protocol and allows control and monitoring of the power module 160 should be clear to those of skill in the art. Likewise, the arrangement of monitoring (e.g. temperature) and control (e.g. fan speed) devices within the power module should be clear to those of skill, as well as their interface with a commercially available wireless (e.g. Bluetooth®) communication module.

The power module can include a button, knob, or other interface to control blower fan speeds and a user interface that provides fan speed information as well as battery charge capacity, either with a small screen or an array of LEDs. A USB charge out feature can be provided to recharge cell phone batteries or to run peripheral accessories. A method for a smokeless combustion device can include actuating a fan motor that is attached to a blower such as an axial or radial impeller fan; drawing ambient air from the exterior of the combustion device; propelling the ambient air through the impeller fan and into a manifold; forcing the propelled air into at least one of a lower jet tube or a upper jet tube; forcing the propelled air within the jet tubes along the body of the jet tube and out a port; transmitting the propelled air exiting the jet tube towards the combustion fire; and forcing a sufficient quantity of air at a sufficient rate to cause complete combustion of the fuel and exhaust gases such that the quantity of emitted smoke is reduced toward a zero value.

Figure 2:
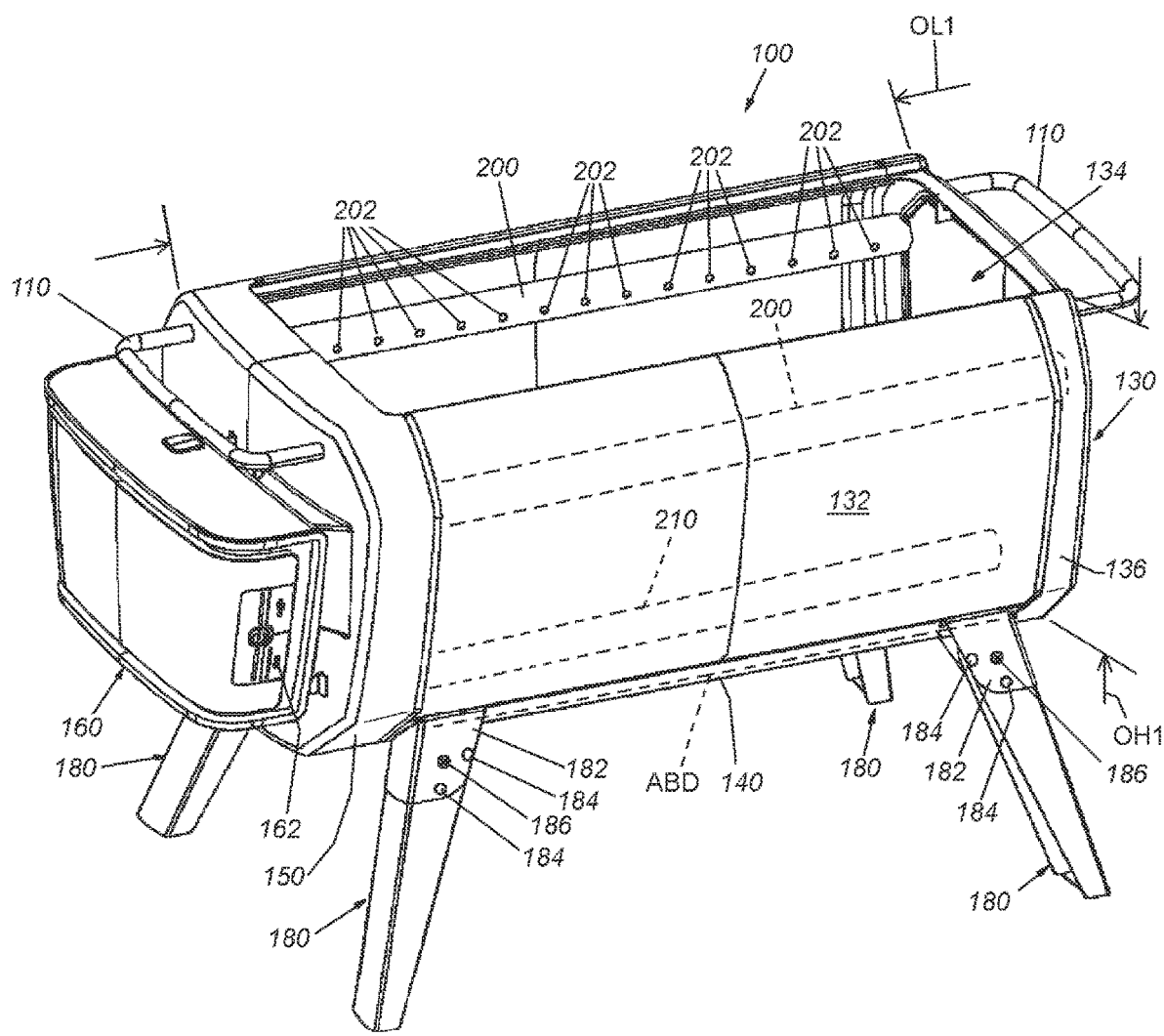
FIG. 2 is a perspective view of the smokeless fire pit, according to the illustrative embodiment.

FIG. 2 is a perspective view of the smokeless fire pit with the grill top removed, according to the illustrative embodiment. The body housing can have a length OL1 of approximately 22 inches (±2 inches) and can have a height OH1 of approximately 9.5 inches (±2 inches). In an embodiment, a fire pit 100 is provided with a primary ("lower") jet 210 and two secondary ("upper") jets 200. Each of the lower and upper jets can have a plurality of ports 202 that are sized and dimensioned to provide for an air flow from the interior of each jet into the combustion chamber 134. Air can be transmitted from the jet tubes through the ports and into the combustion chamber. A lower jet tube 210 is a tube with an opening at one end for receiving forced air from the blower, and a plurality of ports 202 for passing forced air into the combustion chamber. The lower jet tube 210 can have at least one port 202 oriented downwards toward the base plate to reduce the coals, and can have at least one port 202 oriented upwards towards the fuel. An upper jet tube 200 is a tube with an opening at one end for receiving forced air from the blower, and a plurality of ports 202 for passing forced air into the combustion chamber. For the purposes of describing this embodiment, each of the illustrative jet tubes can be a hollow tube that is open at one end (the end nearest the manifold 150) and is provided with a plurality of air ports 202, for the movement of air from the manifold 150 into the combustion chamber 134. In the present embodiment the jet tubes are depicted as being within the combustion chamber, however at least one jet tube can be located outside of the combustion chamber, and the forced air can be transmitted through the ports 202 into the combustion chamber. A manifold 150 can be constructed and arranged to receive forced air from a blower (not shown) with a blower motor that is activated by the power module 160. The manifold can distribute the forced air into the respective jet tubes, to drive air into the combustion chamber. The power module 160 can be provided with a control button 162. A perforated end cap 136 for viewing and aiding in combustion can be situated at an end of the body housing 130, counter posed to the power module. Legs 180 can be connected to the base plate 140 of the body housing 130 at each of the four corners at a mounting support 182 that can be attached to the base plate 140 by welded, rivets or another attachment mechanism. The mounting supports 182 can be constructed and arranged with a plurality of detent holes 184 and detent buttons to allow the legs to fold from an extended configuration to folded configuration, and folded to extended configurations. By way of non-limiting example, the mounting supports 182 can be constructed with three detent holes 184. At least one lockable leg can be folded from an extended configuration to a folded configuration and back to an extended configuration. A pivot pin 186 is located at one end of each leg. The extended configuration can be defined as the legs being locked into a position such that the length of each leg is nearly perpendicular to an axis ABP drawn along the length of the base plate 140 or bottom of the body housing 130. The folded configuration can be defined as the legs being folded such that each leg is in proximity to the base plate 140 or bottom of the body housing 130. A base plate 140 can be constructed of form sheet steel. In the extended configuration, the legs support the fire pit 100 such that the body of the smokeless firepit is situated above the ground and there is a space between the bottom of the body housing 130 and the supporting ground. In the folded configuration, the base plate 140 rests on the supporting ground.

Figure 3:
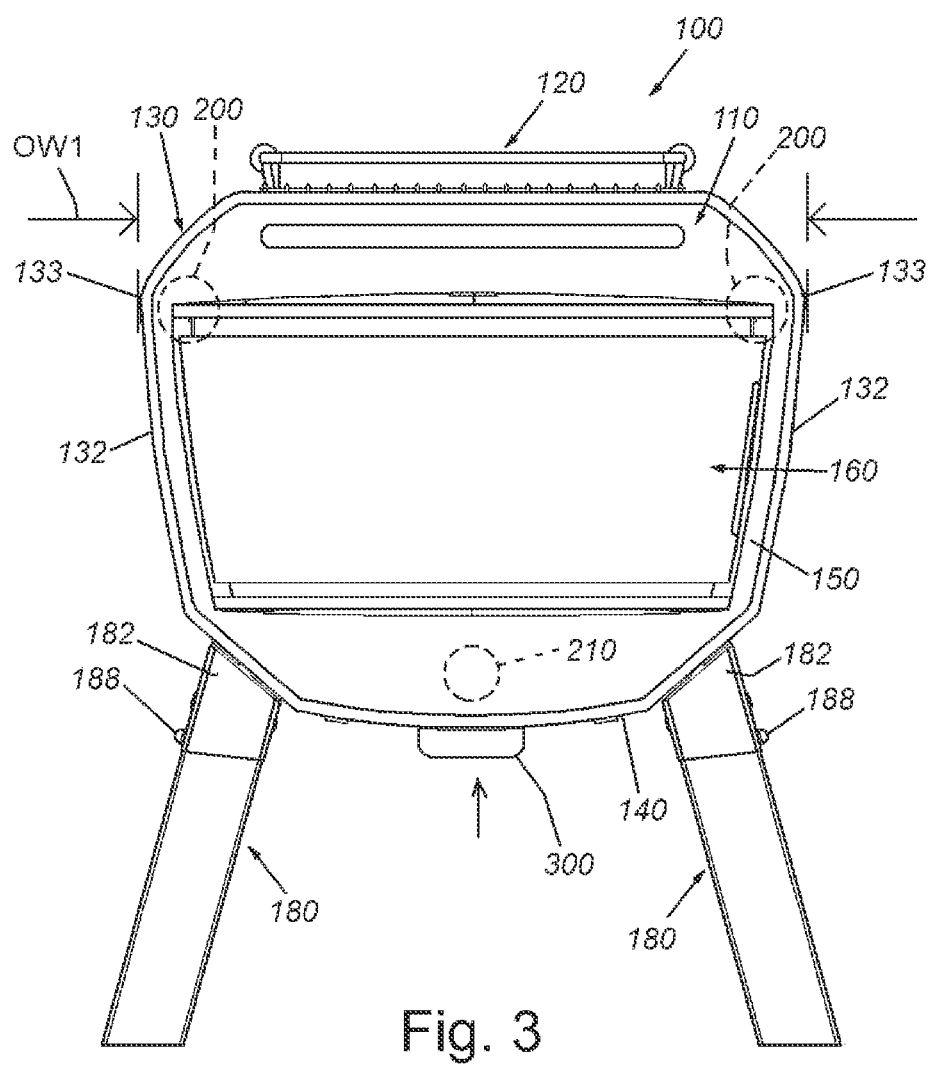
FIG. 3 is a view of a first end of the smokeless fire pit with a manifold, according to the illustrative embodiment.

FIG. 3 is a view of a first end of the smokeless fire pit with a manifold, according to the illustrative embodiment. The fire pit 100 can have a width of approximately 12 inches (±2 inches). A door for removal of ash from the combustion chamber is located along the base plate 140, or bottom of the body housing. The ash door handle 300 for opening and closing the ash door is shown. The detent button 188 on each of the legs 180 is also shown. The profile of the body housing 130 taken across its width can be an irregular polygonal shape. The grill top assembly 120 and the base plate 140 can have a similar width. The body housing can be wider along the sides 132 and can vary such that a fold 133 along each side 132 can be wider than either of the base plate 140 and/or the grill top assembly 120. This greater width can correspond to the location of the upper jet tubes 210. The bottom of the body housing 130 can be narrower than the side 132 at folds 133 so that ash and combustion materials tend to settle toward the bottom (base plate 140). Inward sloping sides 132 urge the ash materials towards the ash door.

Figure 4:
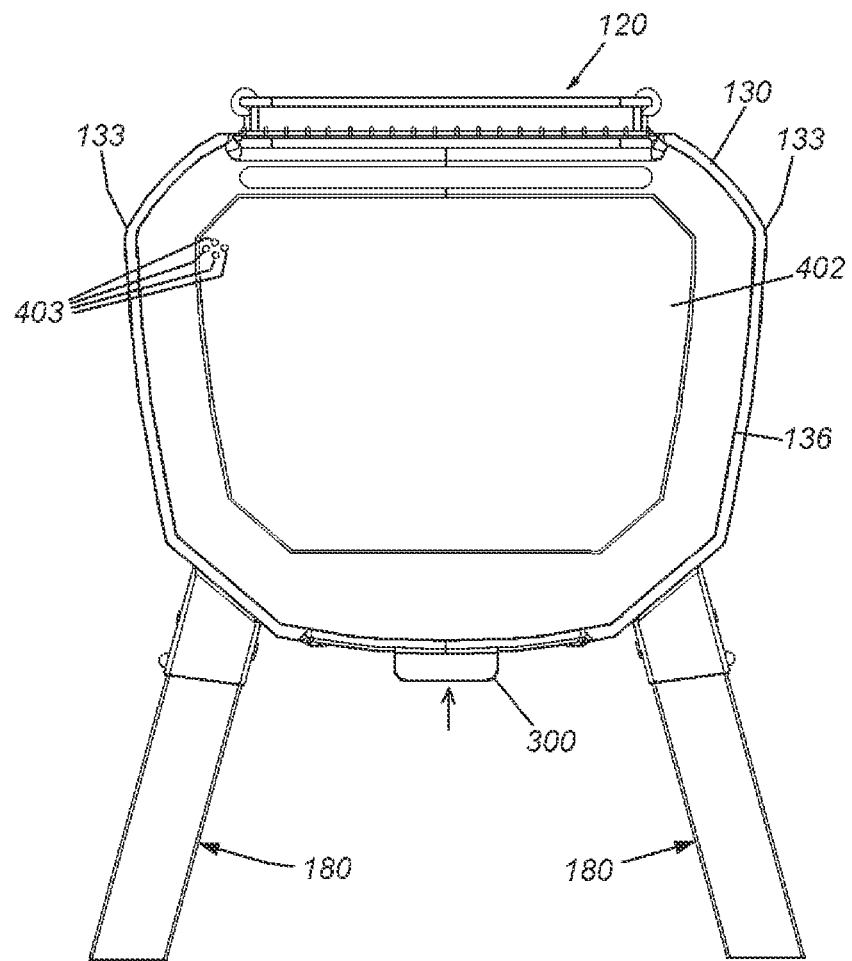
FIG. 4 is a view of a second end of the smokeless fire pit, according to the illustrative embodiment.

FIG. 4 is a view of the fire pit, showing the end that is opposite the end with the power module 160 of FIG. 3. An end cap 136 can be constructed with a perforated panel 402 that is perforated with at least one hole 403 and can function as the perforated sides 132, already described above.

Figure 5:
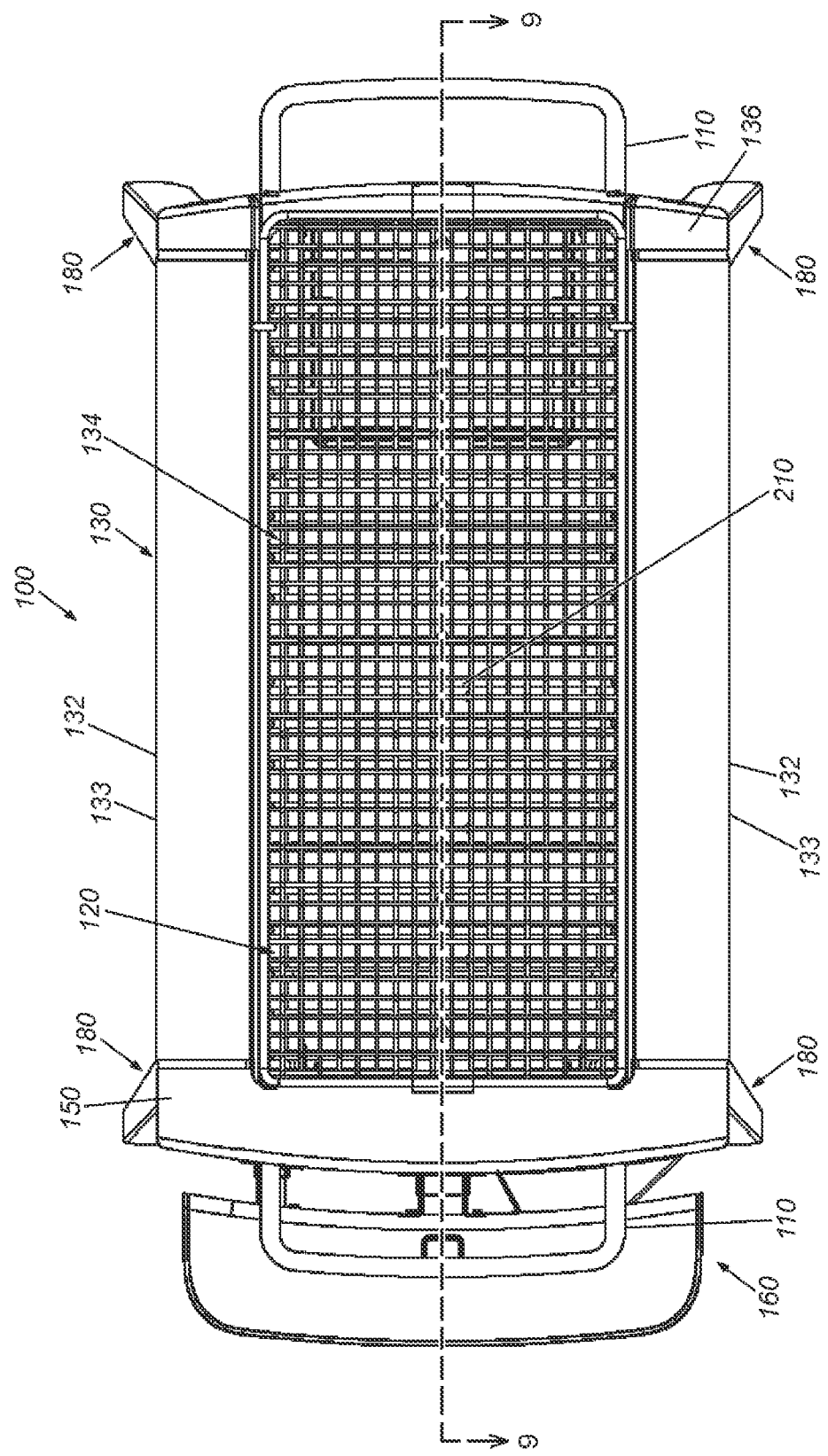
FIG. 5 is a top view of the smokeless fire pit, according to the illustrative embodiment.

A top view of the fire pit is shown in FIG. 5. The grill top assembly 120 can be narrower than the sides 132 at the folds 133 and not lower than the end cap 136 and the manifold 150.

Figure 6:
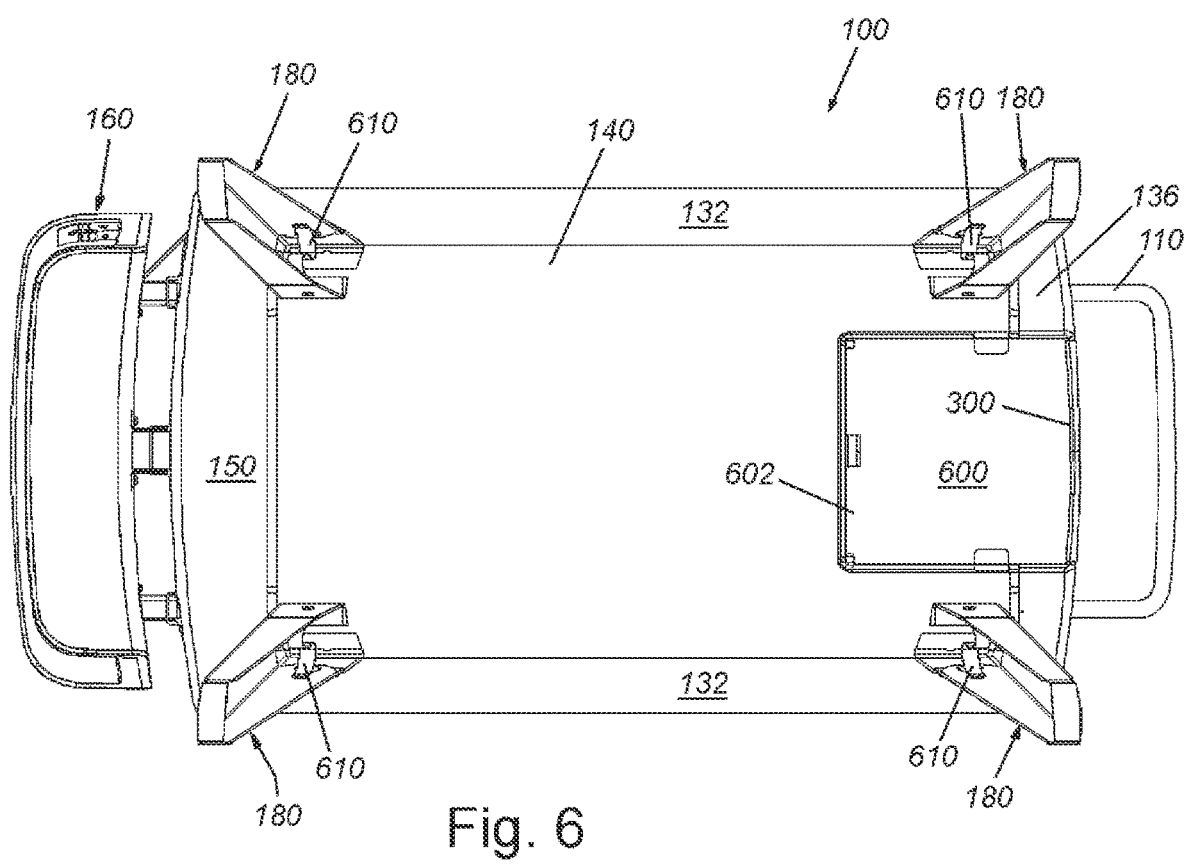
FIG. 6 is a bottom view of the smokeless fire pit, according to the illustrative embodiment.

FIG. 6 is a bottom view of the fire pit. By way of non-limiting example, the ash door 600 is shown as closer to the end cap 136 than top the manifold 150. To dump the ash, the handle 300 of the ash door can be actuated and the ash door 600 is opened by grasping the handle and pulling the door in its slide tracks back from the body housing. The door can be secured with a latch mechanism of various types, including but not limited to a cam lock, a slam lock, a spring latch, a compression latch, a draw latch, a rotary latch and a bolt lock latch. The accumulated ash in proximity to the ash door is then dumped through the opening 602 in the base plate 140 that is covered by the ash door 600. Ash closer to the power module 160 can be dumped by raising the end in proximity of the power module 160 by raising a handle 110 (not shown) at the end opposite of the end cap 136. Ash then falls downwards and out of the opening 602. With regard to the legs 180, a folded spring 610 can provide the locking force for the detent 180 that holds the legs in the extended configuration.

Figure 7:
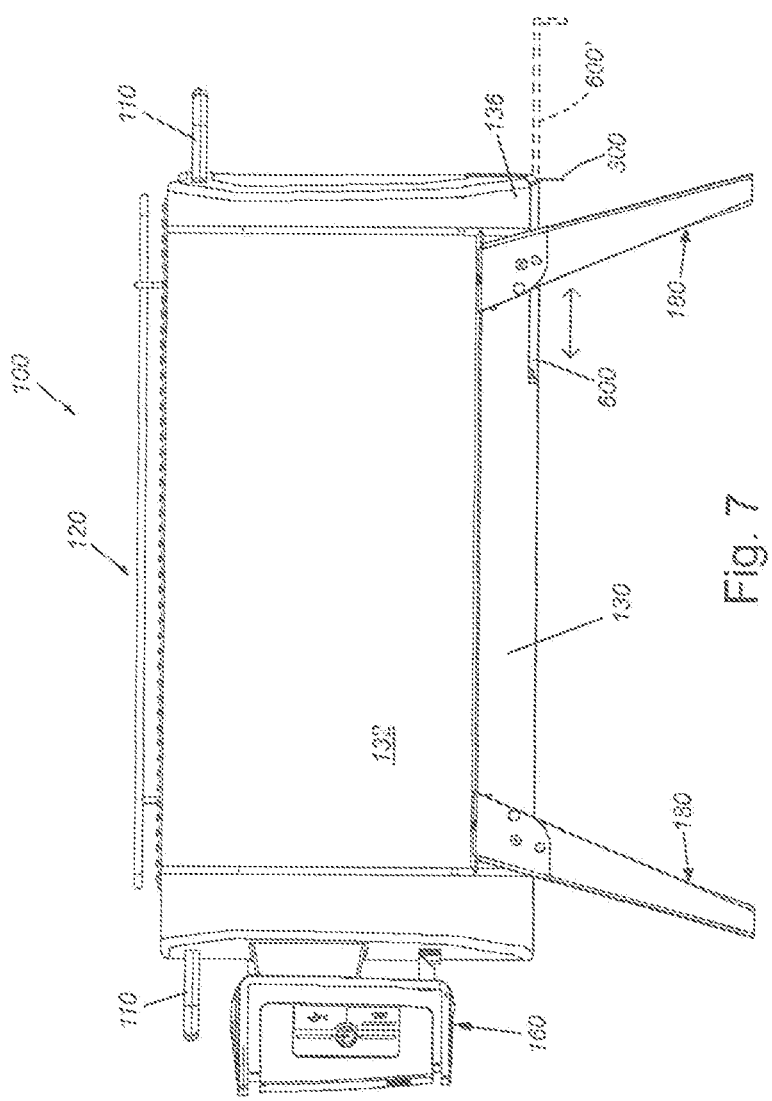
FIG. 7 is a side view of the smokeless fire pit, according to the illustrative embodiment.

FIG. 7 is a side view the fire pit. As shown that the ash door can be opened to position 600' to facilitate the removal of ash.

Figure 8:
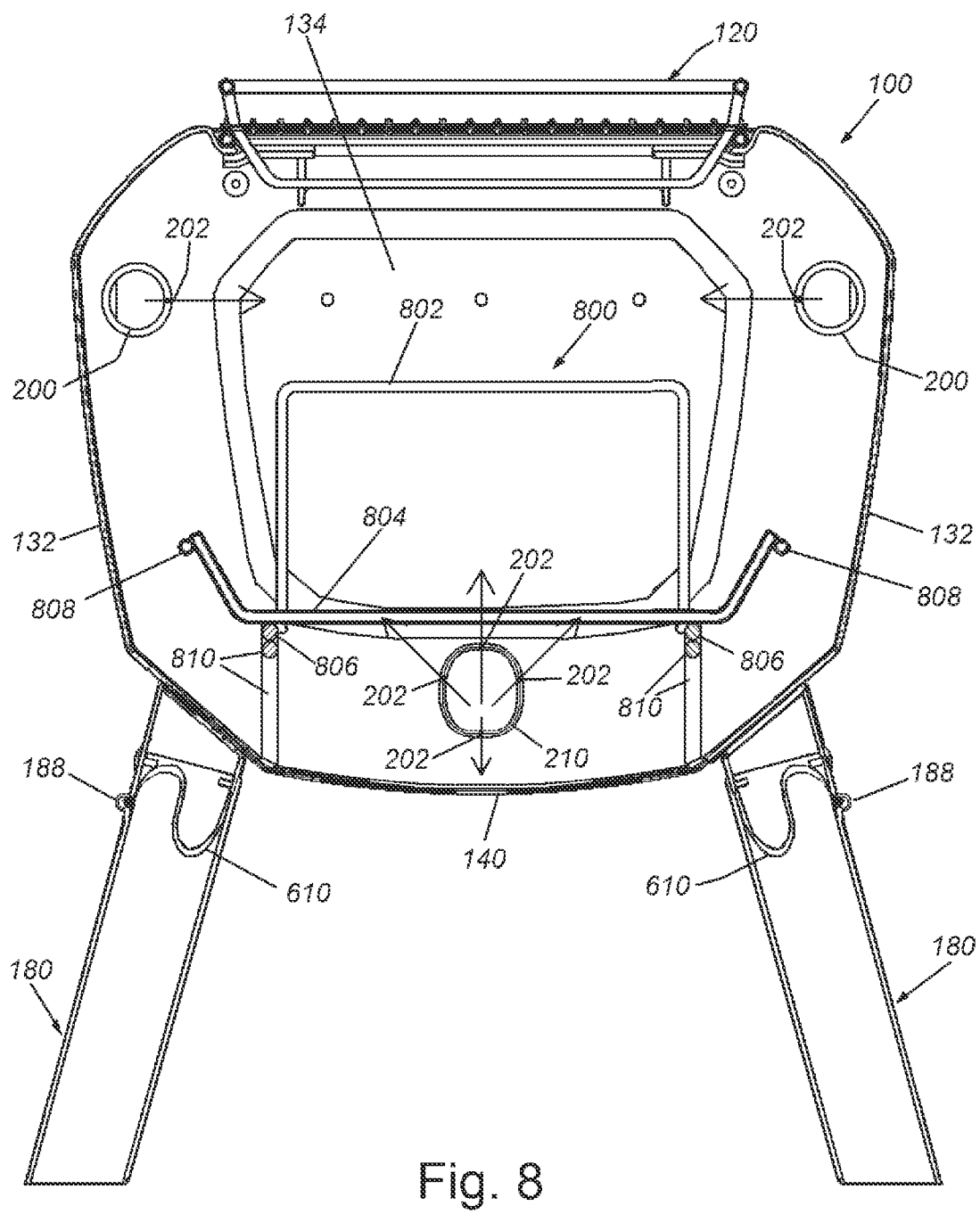
FIG. 8 is a cross-sectional view of the smokeless fire pit along lines 8-8 of FIG. 1, according to the illustrative embodiment.

FIG. 8 is a cross sectional view of the smokeless fire pit along lines 8-8 of FIG. 1. The exemplary combustion chamber 134 can include at least one lower jet tube 210 located along the bottom of the combustion chamber, either on the inside or the outside of the combustion chamber. The ports 202 from the lower jet tube 210 can be within the bottom 30% of the combustion chamber. The ports 202 from the lower jet tube 210 can be within the bottom 25% of the combustion chamber. The ports 202 from the lower jet tube 210 can be within the bottom 20% of the combustion chamber. The ports 202 from the lower jet tube 210 can be above the bottom 5% of the combustion chamber. At least a portion of the ports 202 from the lower jet tube 210 can be above the bottom 10% of the combustion chamber.

The combustion chamber 134 can include at least one jet tube 200 that can be mounted along the outside or inside of the combustion chamber. There can be at least two upper jet tubes 210 that can be mounted one along each of the side walls, for a more complete combustion of the smoke gases. The ports 202 from the at least one upper jet tube 200 can be in the top 50% of the combustion chamber. The ports 202 from the at least one upper jet tube 200 can be in the top 40% of the combustion chamber. The ports 202 from the at least one upper jet tube 200 can be in the top 30% of the combustion chamber. The ports 202 from the at least one upper jet tube 200 can be in the top 25% of the combustion chamber. The ports 202 from the at least one upper jet tube can be below the top 10% of the combustion chamber. The ports 202 from the at least one upper jet tube 200 can be below the top 15% of the combustion chamber. The ports 202 from the at least one upper jet tube 200 can be below the top 20% of the combustion chamber.

The legs 180 are shown with greater detail of the folded leaf springs 610 supporting the locking detents 188. The air flow is depicted from the lower jet 210 and upper jets 200 through a multiplicity of various perforated holes 202 to introduce forced air to surround the combustion chamber 134. A blower can draw air from the outside and can force air into a manifold connected to the lower and upper jet tubes. The blower can be an axial impeller fan, traditional bladed fan, or other blowers as are known in the art. The lower jet tube 210 can be positioned underneath the fuel rack assembly 800 that rests on the bottom of the body housing 130. This lower jet can force air at multiple angles beneath the burning log to encourage even combustion to create a hotter and cleaner flame. Air can be forced directly downwards, directly upwards, upwards and/or downwards at different angles, or combinations of multiple different directions. As shown in the illustrative embodiment, air can be forced directly downwards and can be forced upwards at three different angles, although other arrangements and numbers of angles are specifically contemplated. By way of non-limiting example, air can be forced upwards at angles in a range from 0-45 degrees from directly vertical (relative to a vertical axis extending from the center of the earth through the center of the base plate and upwards, through the center or the top opening). In an embodiment, an angular orientation of 45 degrees creates a more efficacious combustion. In a further embodiment with a greater number of jets (for example, four or five jets), other angular orientations may be used for greater efficiency of combustion. It is further contemplated that the orientation of the jets can be adjusted, either manually or automatically. Changes in the position of the internal fuel rack assembly that supports the combustion material (described more fully below) can result in a re-direction of the jets to a new angular orientation. The position of the lower jet tube 210 at the bottom can also allow the user to place a new log onto the coal bed and almost instantaneously ignite the new log to create a full flame. Doing so with a conventional fire pit would not ignite the added log and creates excessive smoke, with a loss of up to half the potential heat energy, lost in that smoke.

As shown in FIG. 8, the lower jet can include air ports directed downward towards the coal bed to fully combust these coals, thereby reducing the coals to ash. This provides for a long burn time with many logs added in an evening without having to empty the fire pit of ash and coals. This provides for a hotter combustion, which not only pleases the users, but also consumes more of the resins and energy in the smoke, thereby abating the amount of smoke and smoky exhaust. At the end of the burn, the sliding ash door 600 can be slid open and the ash can be safely disposed of Upper jet tubes 200 can receive air from the blower and can be positioned opposing each other at upper sides of the combustion chamber 134, situated above the top of the logs with air ports tuned to allow air penetration into the flames themselves, to complete the combustion. Any smoke that is not ignited by the lower jet(s) is then ignited as a result of the airflow from the upper jets.

An internal rack assembly 800 can be a device that holds the combustion fuel above the lower jet 200. By way of non-limiting example, the fuel rack assembly 800 can be provided with two end handles 802 that are connected to a matrix of bent cross spars 804 that are joined with each other by welded bottom rods 806 and end rods 808. The fuel rack located in the combustion chamber can be raised or lowered. The rack assembly 800 can rest on folded linear bottom rods 810. The rack assembly 800 can be removable from the fire pit 100 by manipulation and removal through the opening covered by the grill top assembly 120. The height of the fuel rack assembly 800 can be adjustable. In the embodiment of FIG. 8, the rack assembly 800 can be raised to a secondary height when the handles 802 are engaged with brackets 1508 (described more fully below) so that when charcoal is burned or the coal bed is low, it can be raised into proximity with the food on the grill. The height of the fuel rack could also be adjustable by way of chains and sprockets, scissor jacks, or other means known in the art. The grill top 124 can be a spark arrestor and can support items of food. The jets inject a supply of air into the combustion chamber for an even, controlled burning of the fuels. The even placement of the air ports in the jets burns the fuel evenly, avoiding a smoldering chunk at the end of the burn.

Figure 9:
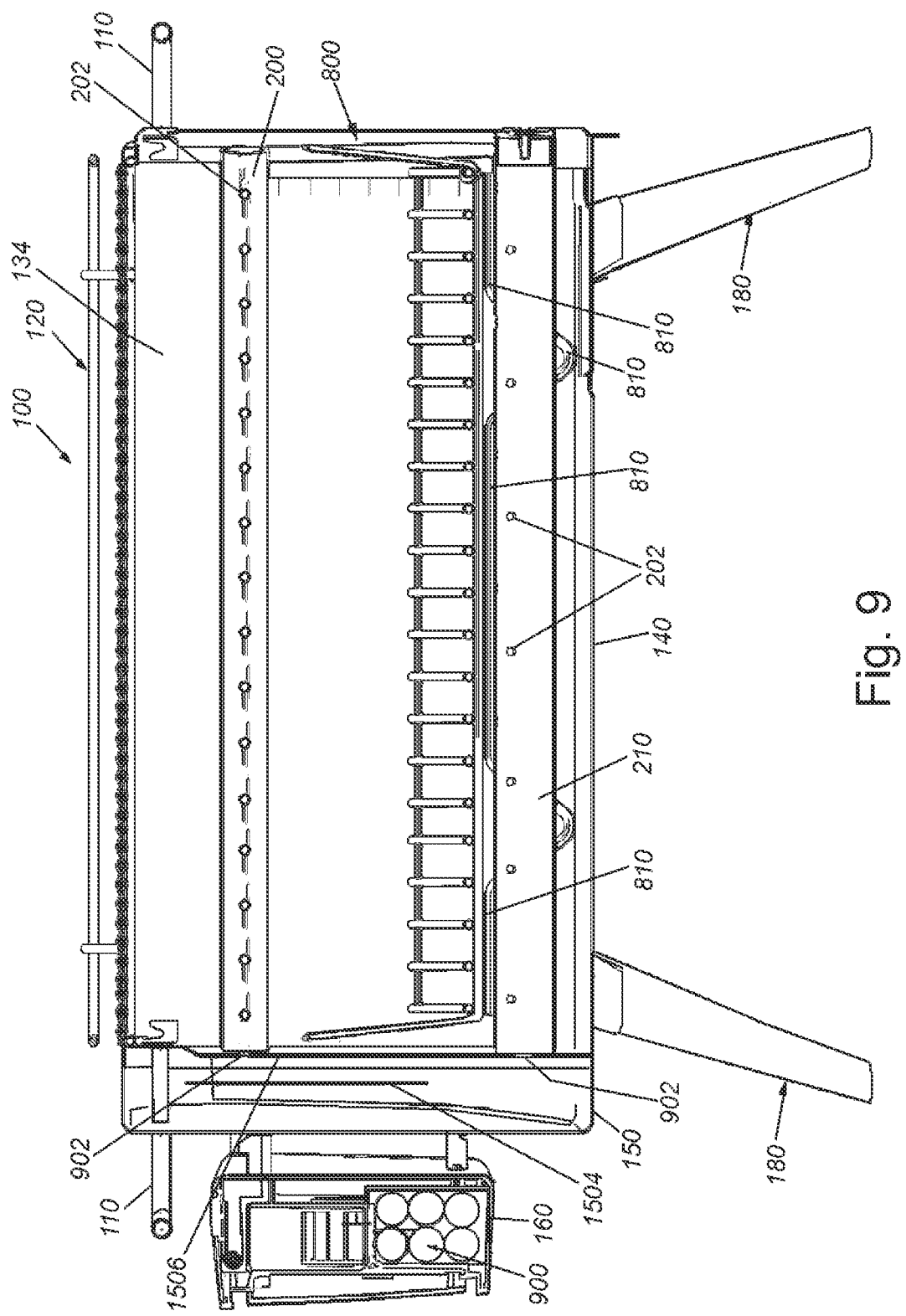
FIG. 9 is a cross-sectional view of the smokeless fire pit along lines 9-9 of FIG. 5, according to the illustrative embodiment.

FIG. 9 is a cross-sectional view of the smokeless fire pit along lines 9-9 of FIG. 5. Power module 160 can have a battery pack 900. There can be enough battery capacity to run the FP for up to 40 hours on the low fan setting in an embodiment. It is contemplated that larger capacity batteries or more batteries could be provided for a longer charge life. In an embodiment, the batteries are fixed within the removable power module and the power module can be removed and recharged. The rechargeable batteries can be taken indoors or to a vehicle to be recharged through a micro USB port. In the illustrative embodiment, the batteries are fixed within the power module and are non-removable. In other embodiments, the batteries can be arranged in a removable pack. Likewise, the power module itself is removable for recharging of the batteries. It is contemplated that the power module and forced air system can be charged and run while connected to a charging cable that is plugged into conventional household current. In another embodiment, the forced air system can directly wired into a stationary power source when a larger and immobile combustion device is installed.

Furthermore, if external devices are attached at a receptacle plug such as a USB port to the power module, they can be recharged from the charge in the battery pack. The folds of the bottom rods 810 are shown. The upper jets 200 and the lower jet 210 can be joined to the manifold and holes 902 that perforate the inner manifold 1506 to allow air to move from inside the manifold 150 into the jets 200, 210.

Figure 10:
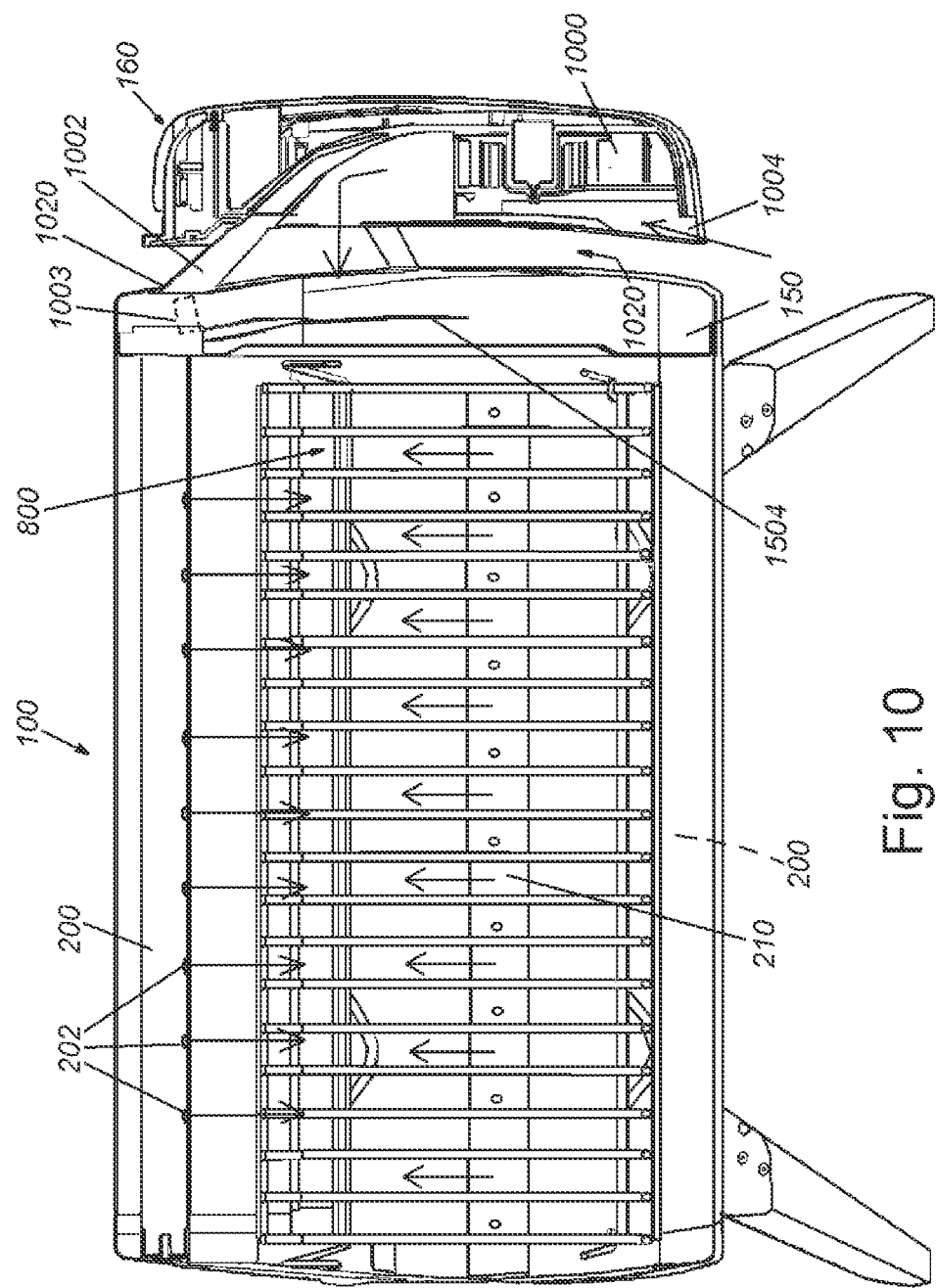
FIG. 10 is a perspective schematic view of the smokeless fire pit, according to the illustrative embodiment.

FIG. 10 is a perspective schematic view of the smokeless fire pit, according to an illustrative embodiment. FIG. 10 shows a flow of air from a blower fan assembly 1000 through the blower body 1002 into the manifold 150, and into the lower jet 210 and the upper jets 200. Ambient air enters into the blower fan 1000 via an intake 1004 located at one end of the power module 160. The air is then propelled through the blower body by movement of the blower fan. The air can then be forced into the manifold 150. The forced air encounters the manifold radiation shield 1504 that is placed so as to admit the forced air from the blower body 1002 without causing impedance to the air flow, while at the same time preventing heat from the combustion chamber from entering the power module 160. This can be one of two preventive features to keep the power module 160 from overheating as a result of combustion. The second preventive feature is an air space 1020 that is created between the manifold 150 and the power module 160. In a further embodiment, a baffle 1003 can be placed along the path of the air flow at a point between a jet and the blower body, so that when the baffle is activated, it can rotate from a position where it is not impeding the air flow to a position where it is partially or fully impeding the air flow, so as to regulate the amount of air flowing into a particular jet. It is contemplated that each of the jet tubes can be provided with a baffle, and that the baffles can be adjusted individually and/or collectively, either manually or collectively.

Figure 11:
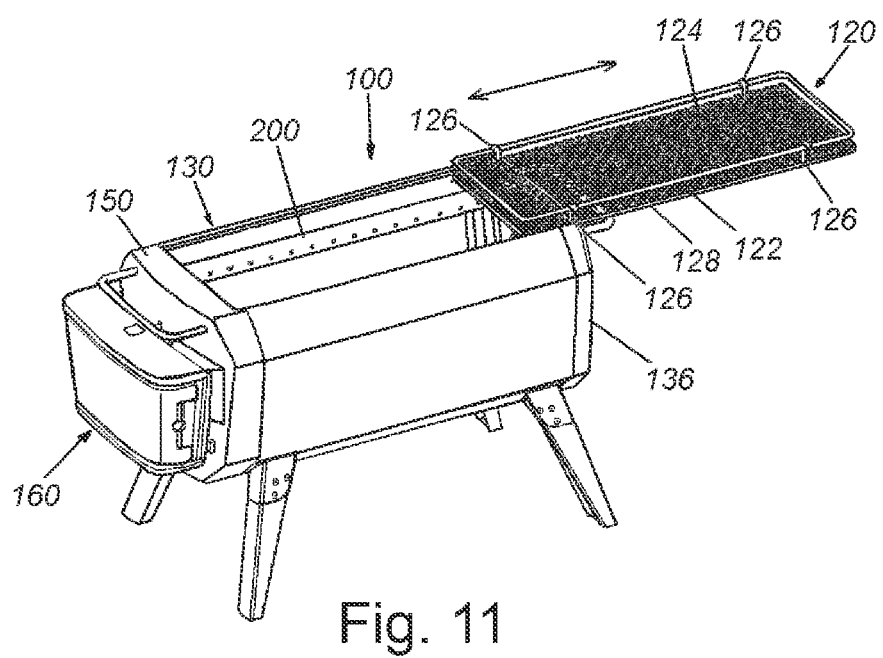
FIG. 11 is a view of the smokeless fire pit showing the grill assembly partially removed, according to the illustrative embodiment.

FIG. 11 shows the lateral movement of the grill top assembly 120 onto and off of the body housing 130 over the end cap 136. This movement permits the re-fueling the combustion chamber, as well as removal of the grill top, if desired.

Figure 12:
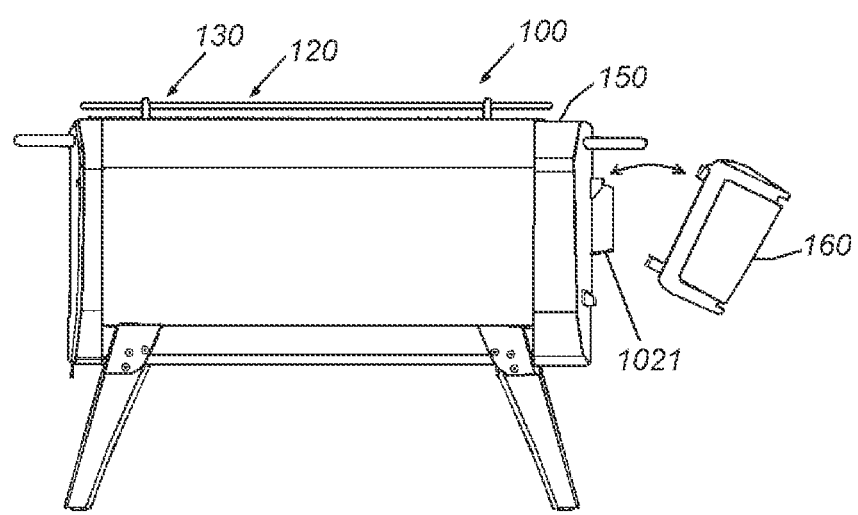
FIG. 12 is a view of the smokeless fire pit showing the power module removed, according to the illustrative embodiment.

FIG. 12 depicts the removable power module 160 that is detachable from the body housing 130 at the manifold 150. A shroud 1021 for the blower body 1002 remains attached to the manifold 150.

Figure 13A:
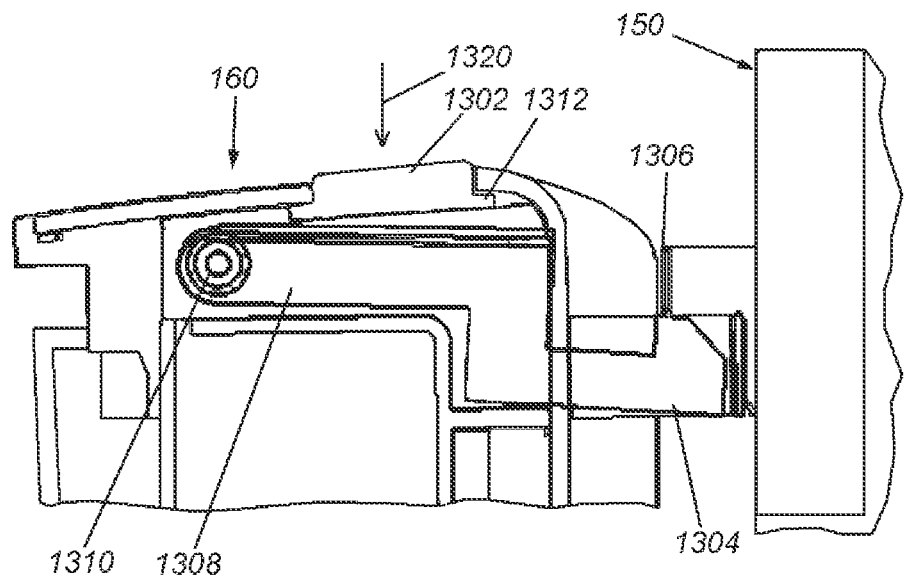
FIG. 13A is a view of a locking mechanism for the power module showing the power module being removed, according to the illustrative embodiment.
Figure 13B:
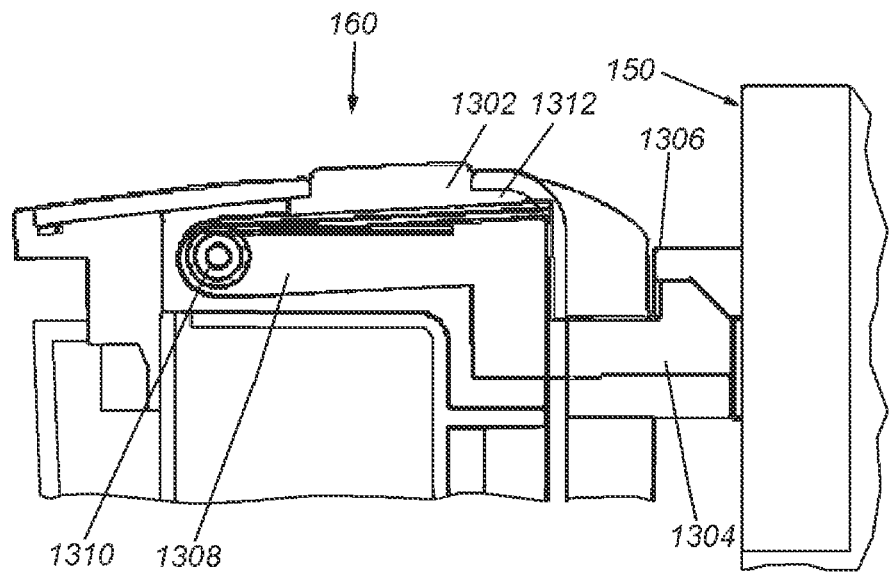
FIG. 13B is a view of a locking mechanism for the power module showing the power module being re-engaged with the smokeless fire pit, according to the illustrative embodiment.

FIGS. 13A and 13B show the locking mechanism for attachment of, and detachment of the power module 160 to the manifold 150, according to an embodiment. A button 1302 can actuates locking arm 1304 that engages a tab 1306 located on the manifold 150. The locking arm 1304 is kept under tension by a spring 1308 that is wrapped around an axle 1310 and that engages the inner surface of a fold 1312 on the top of the locking arm 1304. FIG. 13A is a view of a locking mechanism for the power module showing the power module being removed. A downward force in direction 1320 is applied to the button 1302 that moves the locking arm 1304 against the tension of spring 1308, allowing the end of the locking arm 1304 to pass beneath and inside of tab 1306. FIG. 13B is a view of a locking mechanism for the power module showing the power module being re-engaged with the smokeless fire pit. When the downward force is removed from the button 1302, the tension of spring 1308 pushes locking arm 1304 upwards, thereby locking the power module 160 to the manifold. The attachment is sustained by the constant tension of spring 1308.

Figure 14:
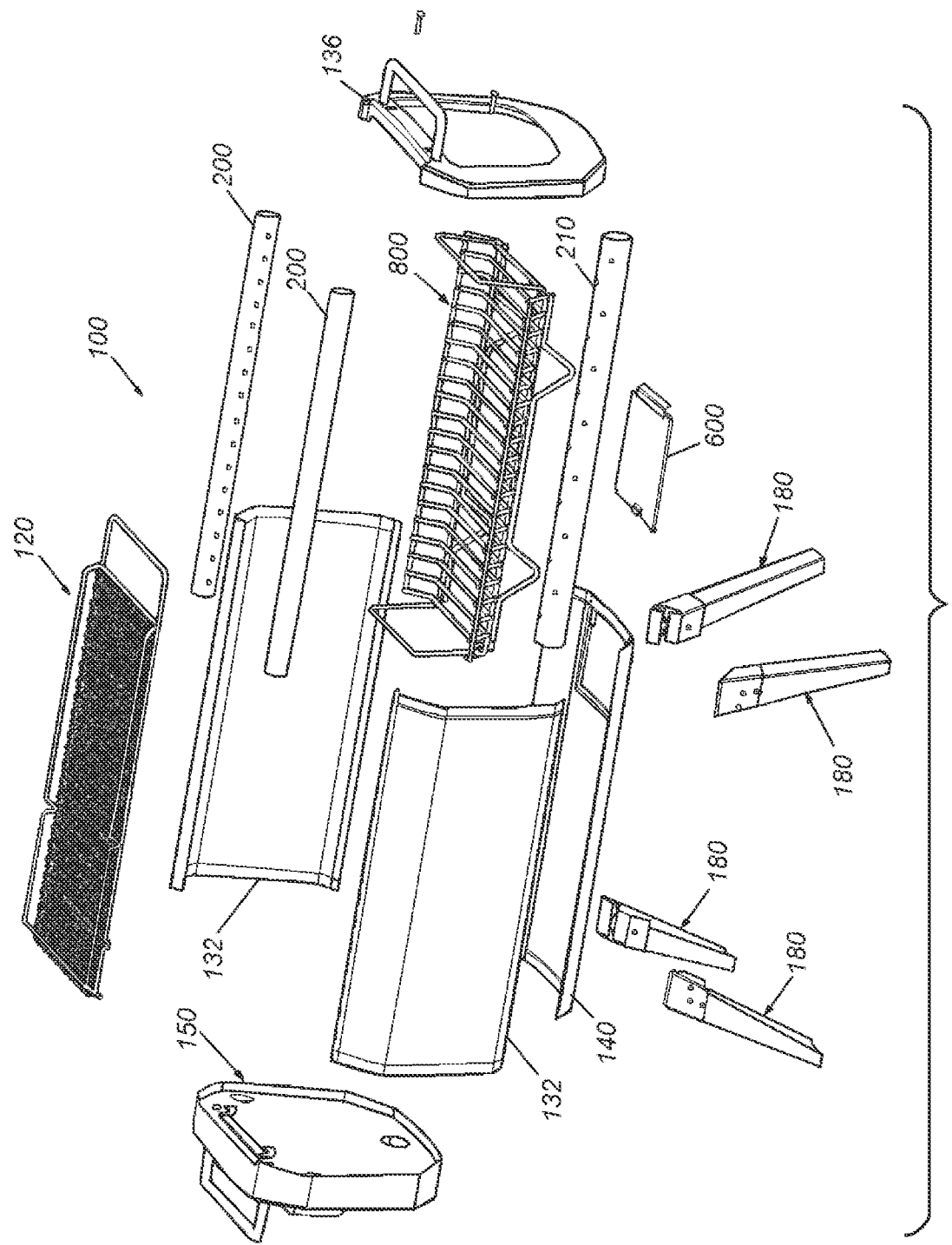
FIG. 14 is an exploded view of a body housing for the smokeless fire pit, according to the illustrative embodiment.

The exploded view of FIG. 14 shows the components and assemblies as set forth above. The power module is not shown as attached to the manifold 150. As shown, the components can be formed of sheet metals, wire, extruded parts, and/or other methods of manufacture, which are formed and joined into various assemblies. This construction keeps the weight relatively light.

Figure 15:
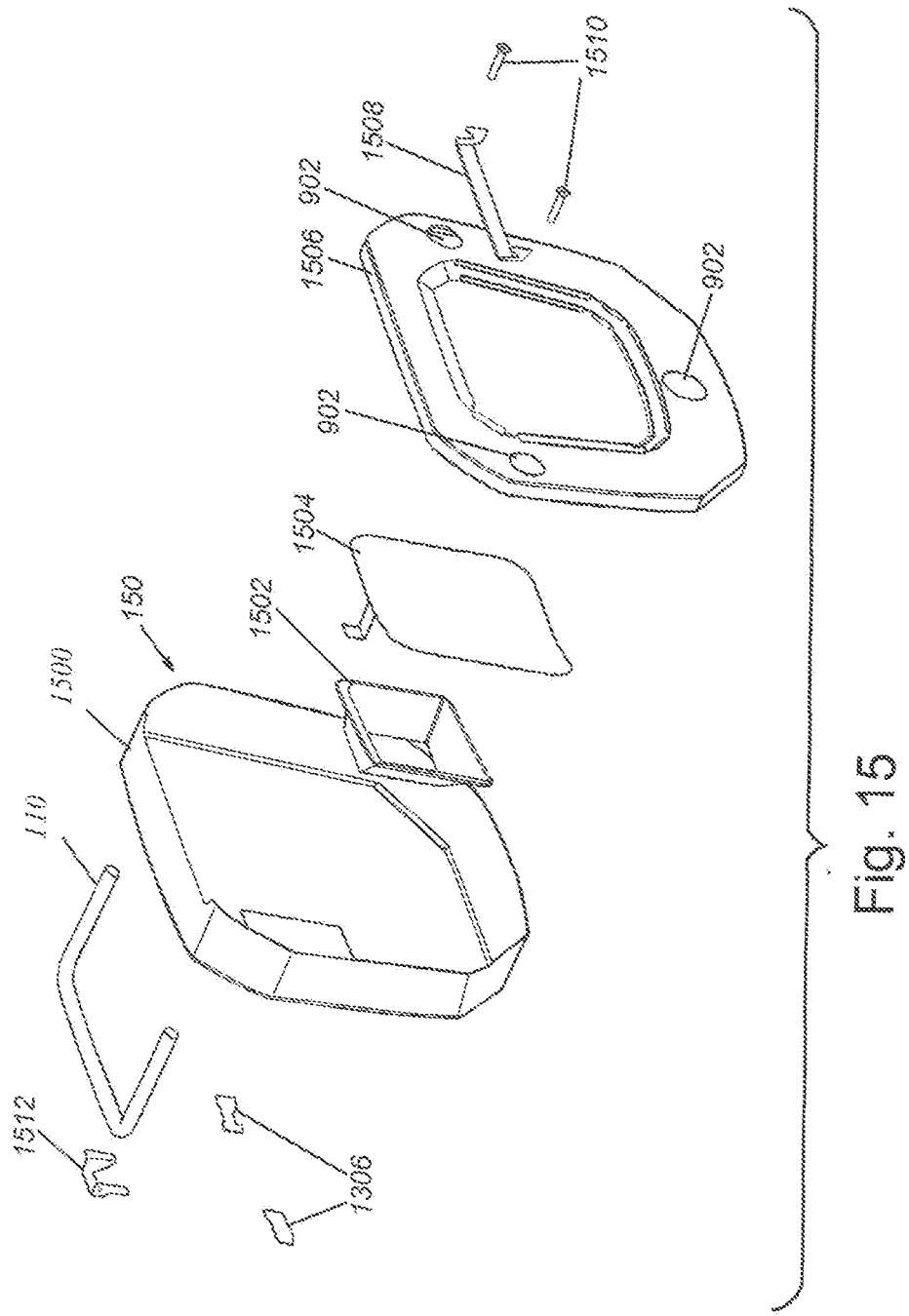
FIG. 15 is an exploded view of a manifold for the smokeless fire pit, according to the illustrative embodiment.

In FIG. 15, the various components of the manifold are shown in an exploded view, according to an embodiment. The manifold 150 is an assembly that can include a handle 110, an outer manifold 1500 and an inner manifold 1506. The outer manifold has a manifold inlet 1502 to guide the air into the manifold 150. A radiation shield 1504 protects the manifold inlet 1502 from radiant heat from the combustion chamber that might otherwise enter the power module and cause failure of the power module. The inner manifold 1506 is provided with openings 902 for the movement of air into the jets. A bracket 1508 for holding the rack assembly 800, with attaching screw 1510, is shown in proximity to the inner manifold 1506. Tabs 1306 and the center manifold bracket 1512 are shown in proximity to the outer manifold 1500.

Figure 16:
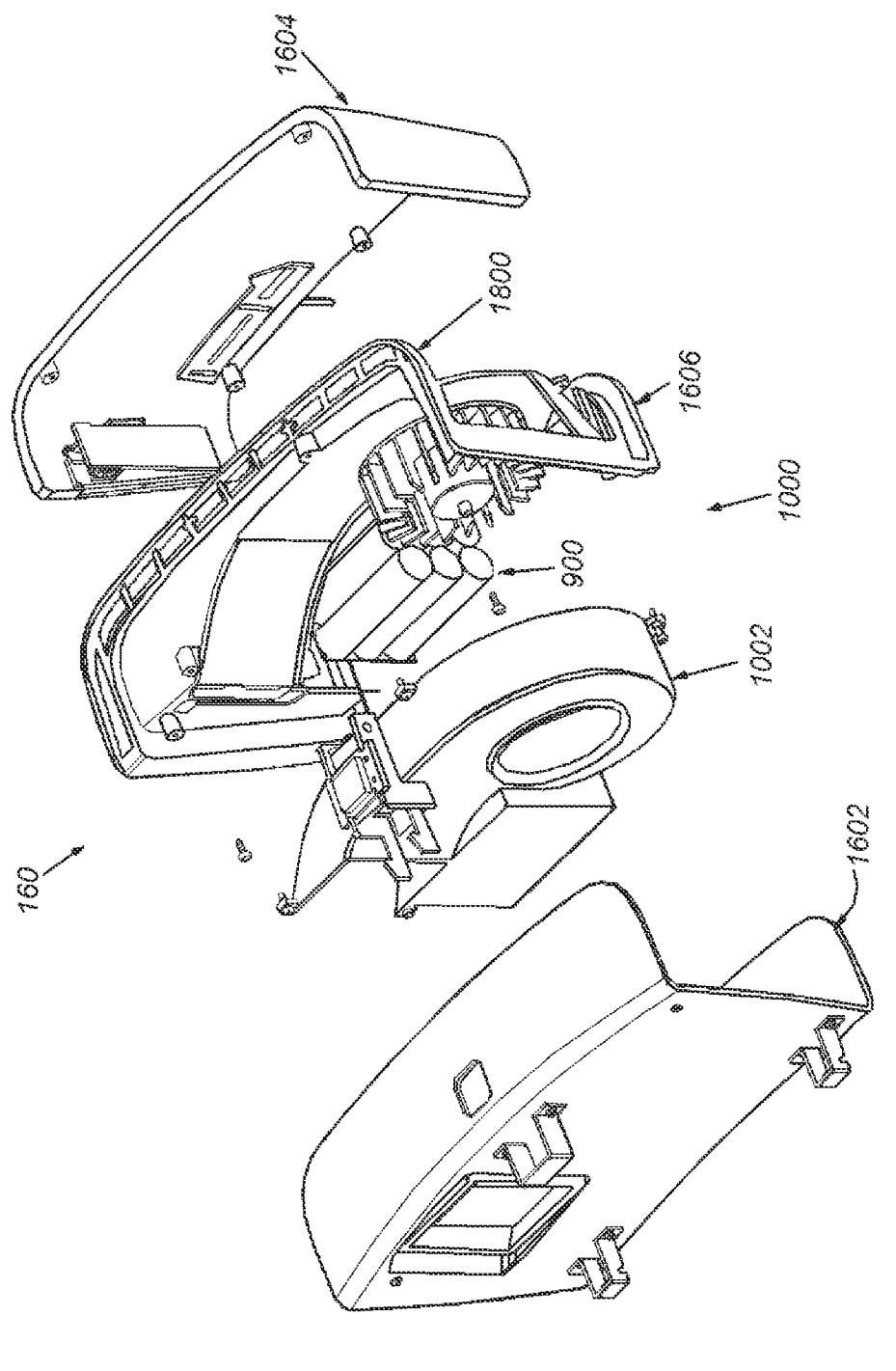
FIG. 16 is an exploded view of the power module for the smokeless fire pit, according to the illustrative embodiment.

FIG. 16 is an exploded view of the power module 160 for the smokeless fire pit, showing the components according to an embodiment. A housing back 1602 is the portion that connects to the manifold. The blower fan 1000 includes a blower body 1002, a blower fan with motor 1606, batteries 900 and is protected by a housing front 1604. Not shown are the electrical components that turn the blower fan on and off, and regulate its rate of flow.

Figure 17:
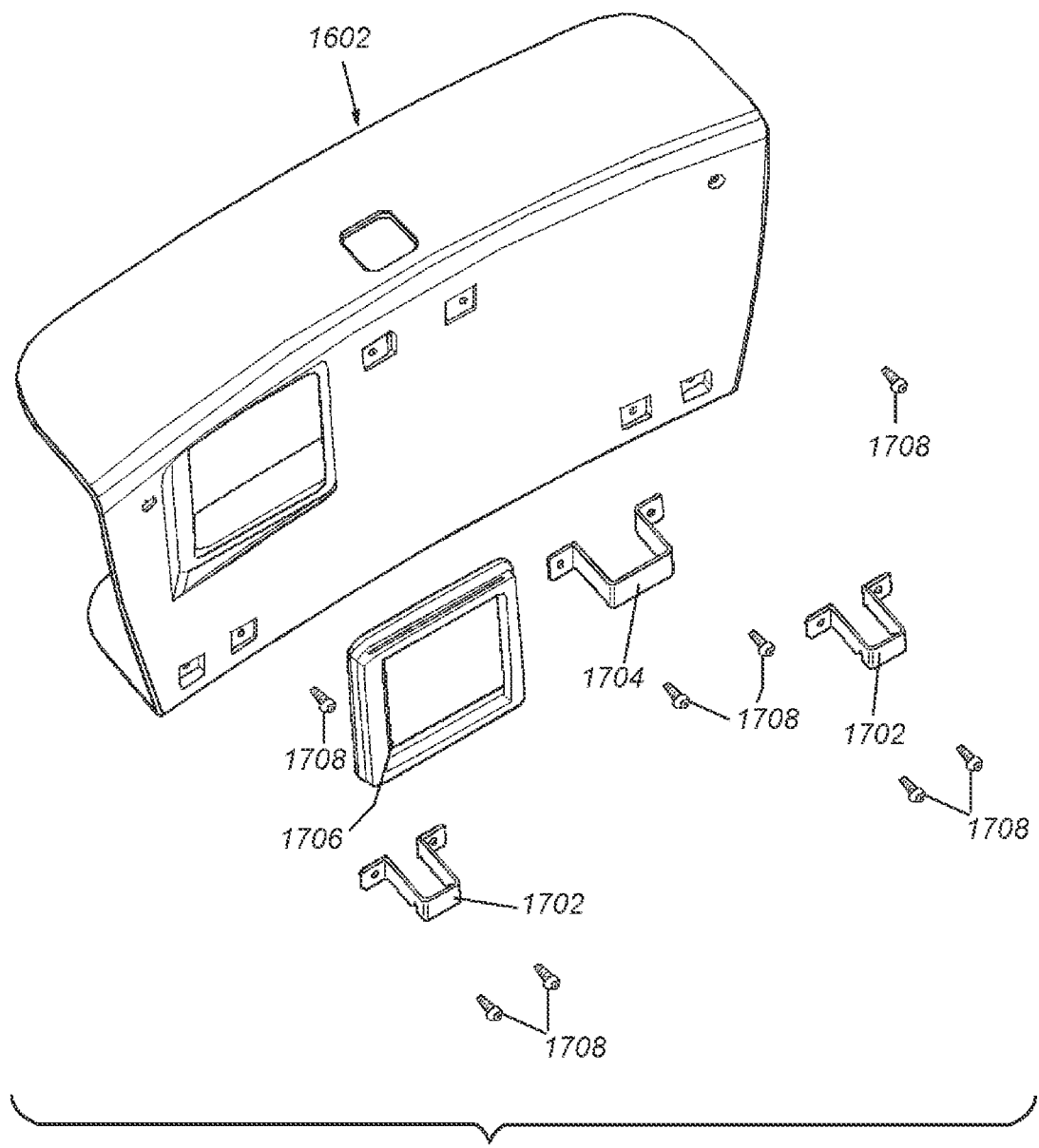
FIG. 17 is an exploded view of a housing for the power module for the smokeless fire pit, according to the illustrative embodiment.

The sub-components of the housing back 1602 are shown in FIG. 17, according to an embodiment. The components include a set of bottom brackets 1702, a latch stand off 1704 and a duct gasket 1706. A plurality of screws hold the brackets 1702 and stand off 1704 to the housing back 1602.

Figure 18:
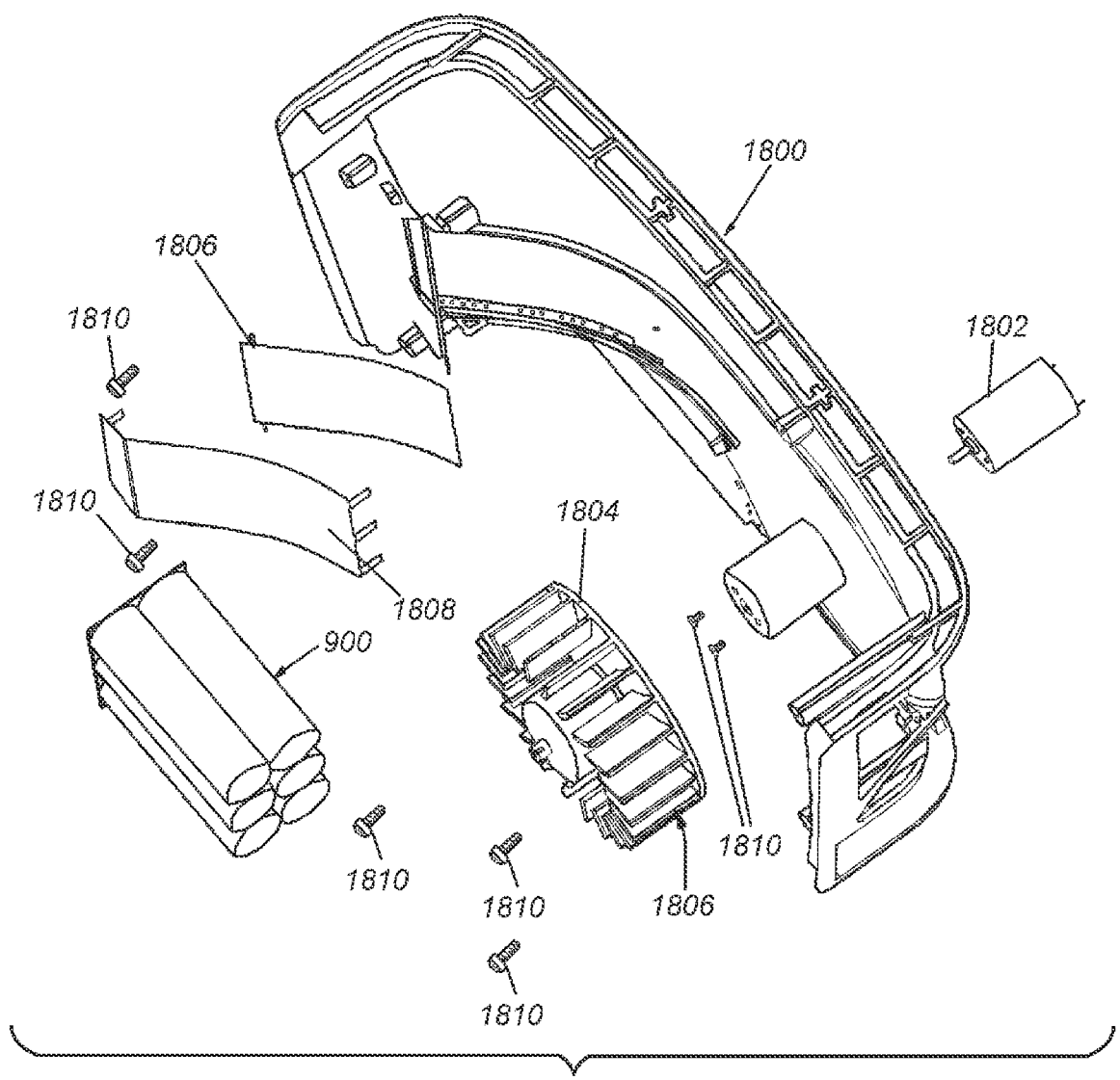
FIG. 18 is an exploded view of a blower fan components for the smokeless fire pit, according to the illustrative embodiment.

The blower fan components are shown in FIG. 18 is an exploded view, according to an embodiment. The blower fan and motor 1606 can be comprised of a motor 1802 and an impeller 1804. The motor is a commercially available fan motor. The manifold is constructed and arranged to include a manifold heat radiation shield 1806 that dissipates excessive heat within the power module, while an insulation shield 1808 protects the on/off control components from excessive heat. Various screws 1810 anchor the components to one another.

Figure 19:
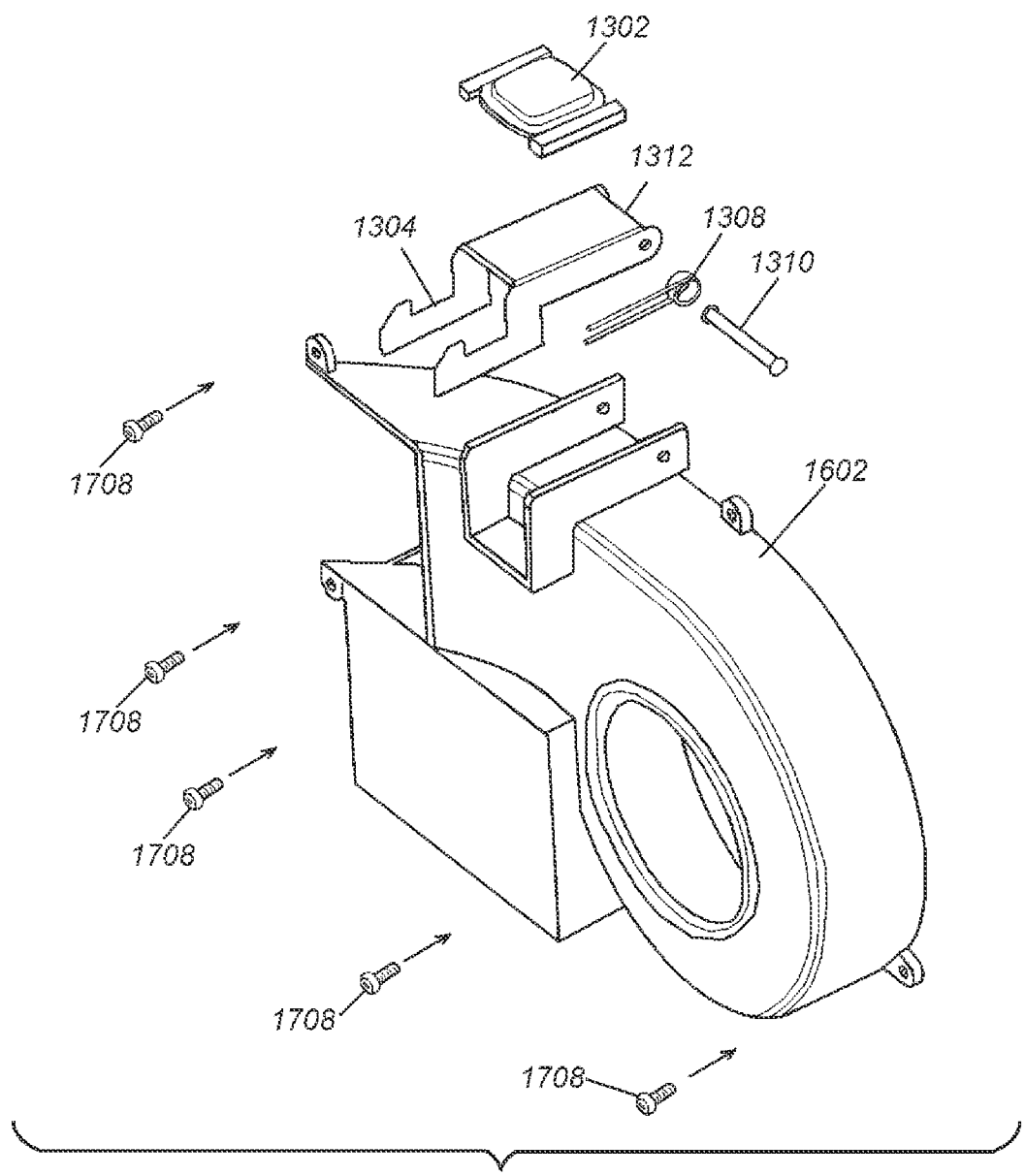
FIG. 19 is an exploded view of the blower body for the smokeless fire pit, according to the illustrative embodiment.

FIG. 19 is an exploded view of the blower body 1602, according to an embodiment. The components include the button 1302 that releases the power module from the manifold. Latch 1304 with the fold 1312, the tension springs 1308 and the axle 1310 are shown. Tensions spring 1308 can be a torsion spring.

It should be clear from the foregoing that the illustrative fire pit is a combustion device that draws ambient air into an impeller fan that propels the forced air into a manifold and drives that air into jet tubes. The forced air then exits the jet tubes through ports and is directed into the combustion chamber. The forcing of air into the combustion chamber during combustion causes a more efficient burning and consumption of the fuel. This in turn consumes most, if not all of the smoke and fully consumes the fuel to avoid smoldering fuel components. Perforations in the side walls and end caps contribute to both the draw of air into the combustion chamber, but also provide a viewing of the combustion. The airflow is controllable by operation of the power module. The combustion device is compact, built of light materials and is readily portable.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the current embodiment does not use a Thermo-electric Generator (TEG) to generate the power for the fan or a charge out feature, it is contemplated that in another embodiment, a TEG can be included in or near the combustion chamber for the generation of electrical power during combustion. While in the present embodiment, a single blower fan is shown, it is expressly contemplated that more than one blower fan could be provided. It is further contemplated that each of the lower jet and upper jets can have their own blower fan, acting jointly or independently. The size and shape of the body housing can include other shapes, for example, ovoid, hexagonal, round in profile. The size of the fire pit can be larger, and the above described features can be provided as a permanently situated installation, for example, in a fire place or in a fire box. It is contemplated that the jet tubes can be mounted outside the combustion chamber, and ported into the combustion chamber. It is further contemplated that the air induction system can be arranged without a manifold and that a blower (or a plurality of blowers) can be directly immediately into each jet. Furthermore, the above described features (in particular, the forced air system, including the lower and upper forced air systems) can be provided as part of a kit for installation in a custom designed fire pit. Additionally, while the air flow driver is defined herein as an impeller, it is expressly contemplated that a storage tank or air compressor could be used for release at appropriate time, in appropriate volume via a valve and conduit. Accordingly, this description is meant to be taken only by way of example, and not to otherwise limit the scope of this invention.

What is claimed is:

1. A combustion device comprising:
   a combustion chamber defined by walls, and having perforations within at least one portion of at least two of the walls, the perforations facilitating air flow directly between an interior of the combustion chamber defined by a first surface of at least one wall of the at least two walls and an ambient environment outside of the combustion device defined by a second surface of the at least one wall that is opposite the first surface of the at least one wall, the at least one wall further defining an exterior wall of the combustion device;
   an air jet tube assembly having ports each in communication with the combustion chamber; and
   a blower operatively connected to the air jet tube assembly, whereby when the blower is turned on, air from the blower is forced through the air jet tube assembly, through the ports, and into the combustion chamber,
   wherein the walls define a pair of opposing side walls and a pair of opposing end caps and wherein the perforations are located on at least one of (a) the pair of opposing sidewalls and (b) the pair of opposing end caps, and
   wherein the jet tube assembly comprises (a) at least one lower air jet tube having at least one lower port in communication between an interior of the lower air jet tube and the combustion chamber, the at least one lower port being in a lower region of the combustion chamber, and (b) at least one upper air jet tube having at least one upper port in communication between an interior of the upper jet tube and the combustion chamber, the at least one upper port being in an upper region of the combustion chamber.

2. The combustion device of claim 1, wherein the at least one lower port is within the bottom 30% of the combustion chamber.

3. The combustion device of claim 1, wherein the at least one lower port comprises at least one port directed upwards and at least one port directed downwards.

4. The combustion device of claim 1, wherein the at least one upper port is within the top half of the combustion chamber.

5. The combustion device of claim 1, wherein the combustion chamber includes a fuel rack, and wherein the height of the fuel rack is adjustable.

6. The combustion device of claim 5, wherein the at least one upper port is higher than the fuel rack.

7. The combustion device of claim 1, wherein the blower is within a detachable power module, the blower being selectively connectable to a manifold.

8. The combustion device of claim 1, wherein the at least one upper jet tube is located along at least one sidewall of a pair of opposing sidewalls of the combustion chamber.

9. The combustion device of claim 1, further comprising a slidable ash door in the bottom of the combustion chamber, the slidable ash door adapted for a user to grasp and slide the slidable ash door open while a fire is burning in the combustion device.

10. The combustion device of claim 1, further comprising a fuel rack, wherein the at least one lower port is lower than the fuel rack.

11. The combustion device of claim 1, further comprising, a grill surface at least partially over an opening between the interior of the combustion chamber and the ambient environment outside of the combustion chamber.

12. The combustion device of claim 11, wherein the grill surface can slide on a track between a first position over the opening and a second position that exposes at least a portion of the opening, whereby new fuel can be added to the combustion device via the opening without removing the grill surface from the combustion device.

13. A combustion device comprising:
   a combustion chamber defined by a plurality of walls, between an interior of the combustion chamber and an ambient environment outside of the combustion device;

a blower operatively connected to the combustion chamber, whereby when the blower is turned on, air from the blower is forced into the combustion chamber; and a power module and a battery within the power module, the battery being selectively connectable to the blower to provide power to the blower.

14. The combustion device of claim 13, further comprising a manifold and an air jet tube assembly in fluid communication between the blower and the air jet tube assembly, the air jet tube assembly having ports each in communication with the combustion chamber, wherein, when the blower is turned on, the air from the blower is forced through the manifold, and into the air jet tube assembly, through the ports, and into the combustion chamber.

15. The combustion device of claim 14 wherein the walls define a pair of opposing side walls and a pair of opposing end caps, further comprising, perforations located on at least one of (a) a pair of opposing sidewalls and (b) a pair of opposing end caps.

16. The combustion device of claim 15 wherein the jet tube assembly comprises (a) at least one lower air jet tube having at least one lower port in communication between an interior of the lower air jet tube and the combustion chamber, the at least one lower port being in a lower region of the combustion chamber, and (b) at least one upper air jet tube having at least one upper port in communication between an interior of the upper jet tube and the combustion chamber, the at least one upper port being in an upper region of the combustion chamber.

17. The combustion device of claim 13 wherein the battery comprises a rechargeable battery.

18. The combustion device of claim 13 wherein power module is constructed and arranged to be detachable from the combustion chamber.

19. A combustion device comprising:
a combustion chamber defined by a plurality of walls, and having perforations within at least one of the walls between an interior of the combustion chamber and an ambient environment outside of the combustion device;
an air jet tube assembly having ports each in communication with the combustion chamber; and
a blower operatively connected to the air jet tube assembly, whereby when the blower is turned on, air from the blower is forced through the air jet tube assembly, through the ports, and into the combustion chamber, wherein a flow rate of air from the blower into the combustion chamber is controllable by adjusting the speed of the blower, and wherein the speed of the blower is adjustable through a wireless connection.

20. The combustion device of claim 19 wherein the walls define a pair of opposing side walls and a pair of opposing end caps and wherein the perforations are located on at least one of (a) the pair of opposing sidewalls and (b) the pair of opposing end caps.

21. The combustion device of claim 20 wherein the jet tube assembly comprises (a) at least one lower air jet tube having at least one lower port in communication between an interior of the lower air jet tube and the combustion chamber, the at least one lower port being in a lower region of the combustion chamber, and (b) at least one upper air jet tube having at least one upper port in communication between an interior of the upper jet tube and the combustion chamber, the at least one upper port being in an upper region of the combustion chamber.

22. A combustion device comprising:
a combustion chamber defined by a plurality of walls, and having perforations within at least one of the walls between an interior of the combustion chamber and an ambient environment outside of the combustion device;
at least one lower air jet tube having at least one lower port in communication between an interior of the lower air jet tube and the combustion chamber, the at least one lower port being in a lower region of the combustion chamber;
at least one upper air jet tube having at least one upper port in communication between an interior of the upper jet tube and the combustion chamber, the at least one upper port being in an upper region of the combustion chamber;
a blower operatively connected to the air jet tubes; and
a manifold in fluid communication between the blower and the jet tubes, whereby when
the blower is on, air from the blower is forced through the manifold, through the jet tubes, through the ports, and into the combustion chamber, wherein the flow rate of air from the blower into at least one jet tube is controllable by adjusting a baffle between the manifold and the at least one jet tube.

* * * * *